(12) United States Patent
Yamamoto

(10) Patent No.: US 11,235,754 B2
(45) Date of Patent: Feb. 1, 2022

(54) TRAVEL TRAJECTORY PREPARATION DEVICE, METHOD, AND PROGRAM, AND DRIVE ASSIST DEVICE AND SYSTEM

(71) Applicant: SANEI CO., LTD., Hiroshima (JP)

(72) Inventor: Tadashi Yamamoto, Hiroshima (JP)

(73) Assignee: SANEI CO., LTD., Hiroshima (JP)

( * ) Notice: Subject to any disclaimer, the term of this patent is extended or adjusted under 35 U.S.C. 154(b) by 335 days.

(21) Appl. No.: 16/327,719

(22) PCT Filed: Aug. 22, 2017

(86) PCT No.: PCT/JP2017/029858
§ 371 (c)(1),
(2) Date: Feb. 22, 2019

(87) PCT Pub. No.: WO2018/038073
PCT Pub. Date: Mar. 1, 2018

(65) Prior Publication Data
US 2019/0184979 A1    Jun. 20, 2019

(30) Foreign Application Priority Data

Aug. 23, 2016  (JP) .............................. JP2016-162737

(51) Int. Cl.
*E21B 43/10* (2006.01)
*B60W 30/045* (2012.01)
(Continued)

(52) U.S. Cl.
CPC .......... *B60W 30/045* (2013.01); *B60W 30/10* (2013.01); *B60W 30/18145* (2013.01);
(Continued)

(58) Field of Classification Search
CPC ......... B60W 30/045; B60W 30/18145; B60W 50/14; B60W 30/18154; B60W 40/072;
(Continued)

(56) References Cited

U.S. PATENT DOCUMENTS

| 5,029,088 A | 7/1991 | Minami |
| 6,711,480 B2 | 3/2004 | Yamamoto et al. |
| (Continued) | | |

FOREIGN PATENT DOCUMENTS

| CN | 102171084 A | 8/2011 |
| EP | 1659367 A1 | 5/2006 |
| (Continued) | | |

OTHER PUBLICATIONS

International Search Report for PCT/JP2017/029858 dated Nov. 21, 2017.

*Primary Examiner* — Sze-Hon Kong
(74) *Attorney, Agent, or Firm* — Womble Bond Dickinson (US) LLP; Joseph Bach, Esq.

(57) ABSTRACT

A travel track creation device (2) includes a travel track creator (42) that creates a travel track including an inlet straight track, an inlet clothoid track formed by connecting a first group of clothoid curves, an arc track, an outlet clothoid track formed by connecting a second group of clothoid curves, and an outlet straight track, wherein the travel track creator (42) includes an arc creator (42a) that creates the arc track which is located further on a side opposite to the center side of the arc portion than a passing target point and a radius of which is as large as possible, the passing target point being separated from an inner edge of the arc portion by a predetermined distance toward the side opposite to the center side of the arc portion, and a clothoid creator (42b) that creates the inlet clothoid track in which a radius of a last tangential arc corresponds to a radius of the arc track and a start point of which is in contact with the inlet straight track and in which a direction angle of the start point corresponds to a direction angle of the inlet straight track, and the outlet clothoid track in which a radius of a last tangential arc corresponds to a radius of the arc track and which is in contact with the outlet straight track and in which (Continued)

a direction angle of a start point corresponds to a direction angle of the outlet straight track.

13 Claims, 18 Drawing Sheets

(51) Int. Cl.
*B60W 30/10* (2006.01)
*B60W 30/18* (2012.01)
*B60W 50/14* (2020.01)
*G08G 1/00* (2006.01)
*B62D 6/00* (2006.01)
*B60W 40/072* (2012.01)
*G01C 21/26* (2006.01)

(52) U.S. Cl.
CPC .... *B60W 30/18154* (2013.01); *B60W 40/072* (2013.01); *B60W 50/14* (2013.01); *B62D 6/00* (2013.01); *G08G 1/00* (2013.01); *B60W 2050/146* (2013.01); *G01C 21/26* (2013.01)

(58) Field of Classification Search
CPC .. B60W 30/10; B60W 2050/146; G08G 1/00; B62D 6/00; G01C 21/26
See application file for complete search history.

(56) References Cited

U.S. PATENT DOCUMENTS

| | | | |
|---|---|---|---|
| 2006/0287817 A1 | 12/2006 | Nagel | |
| 2009/0300067 A1* | 12/2009 | Denaro | B60W 40/076 |
| 2010/0082215 A1* | 4/2010 | Miyajima | B60W 50/0097 701/93 |
| 2010/0106374 A1* | 4/2010 | Miyajima | B60T 8/1755 701/41 |
| 2010/0256856 A1* | 10/2010 | Taguchi | B60L 15/2045 701/31.4 |
| 2011/0060524 A1* | 3/2011 | Miyajima | G01C 21/26 701/300 |
| 2011/0218724 A1* | 9/2011 | Iida | G06N 20/00 701/70 |
| 2011/0264327 A1 | 10/2011 | Nakai | |
| 2012/0209489 A1* | 8/2012 | Saito | B60W 30/18009 701/70 |
| 2013/0006473 A1* | 1/2013 | Buerkle | B60W 30/18145 701/41 |
| 2013/0131925 A1* | 5/2013 | Isaji | B60W 30/16 701/41 |
| 2013/0304322 A1* | 11/2013 | Isaji | B62D 15/025 701/41 |
| 2015/0057922 A1* | 2/2015 | Yabe | G01C 21/3626 701/437 |
| 2015/0336587 A1* | 11/2015 | Inoue | B62D 15/0285 701/41 |
| 2015/0346723 A1 | 12/2015 | Pedersen | |
| 2016/0288785 A1* | 10/2016 | Ezoe | B60W 30/18145 |
| 2016/0313737 A1* | 10/2016 | Berkemeier | A01B 69/008 |
| 2017/0017239 A1 | 1/2017 | Kanai et al. | |
| 2019/0031191 A1* | 1/2019 | Satoh | B60W 30/12 |

FOREIGN PATENT DOCUMENTS

| | | |
|---|---|---|
| JP | 2003337993 A | 11/2003 |
| JP | 4125569 B2 | 7/2008 |
| JP | 2011-183996 A | 9/2011 |
| JP | 2013-513149 A | 4/2013 |
| JP | 5749359 B2 | 7/2015 |
| WO | 2016/051817 A1 | 4/2016 |

* cited by examiner

FIG.2

| TRANSITION CURVE LENGTH DATA | 22c |
|---|---|
| DESIGN SPEED [km/h] | TRANTISION CURVE LENGTH [m] |
| 120 | 100 |
| 100 | 85 |
| 80 | 70 |
| 60 | 50 |
| 50 | 40 |
| 40 | 35 |
| 30 | 25 |
| 20 | 20 |

US 11,235,754 B2

TRAVEL TRAJECTORY PREPARATION DEVICE, METHOD, AND PROGRAM, AND DRIVE ASSIST DEVICE AND SYSTEM

RELATED APPLICATIONS

The present application is the national phase of International Application No. PCT/JP2017/029858, filed on Aug. 22, 2017, which claims priority to and the benefit of Japanese Patent Application No. 2016-162737, filed on Aug. 23, 2016, and the disclosures of which are hereby incorporated herein by reference in their entireties.

TECHNICAL FIELD

The present invention relates to a travel track creation device, a travel track creation method, and a travel track creation program for creating a travel track on which a vehicle travels on a road, and a driving assistance device and a driving assistance system.

BACKGROUND ART

A curve of a road such as an expressway or a main highway includes an inlet straight portion that is an inlet of the curve, an inlet clothoid portion continuous to the inlet straight portion, an arc portion continuous to the inlet clothoid portion, an outlet clothoid portion continuous to the arc portion, and an outlet straight portion continuous to the outlet clothoid portion. Such a configuration of the road enables a vehicle to travel smoothly at high speed so that side-slip of the vehicle can be reduced and uncomfort of a passenger can be reduced.

On the other hand, an intersection in an urban distinct, for example, includes only an inlet straight portion, an arc portion continuous to the inlet straight portion, and an outlet straight portion continuous to the arc portion and does not include an inlet clothoid portion and an outlet clothoid portion in some cases.

FIG. 26 is a plan view illustrating an example of an intersection. This intersection 400 is a crossroad where four roads meet. In a case where a vehicle 410 enters the intersection 400 along an arrow 401 from the left in the drawing and travels out of the intersection 400 along an arrow 402 upward in the drawing, the vehicle 410 passes through an inlet straight portion 403, an arc portion 404 continuous to the inlet straight portion 403, and an outlet straight portion 405 continuous to the arc portion 404.

As a relevant technique, Patent Document 1 listed below describes a driving assistance system that creates a virtual digital travel track using a line, an arc, a clothoid curve, and so forth based on a road parameter and positional information on a vehicle.

Patent Document 2 listed below describes a road map creation device that detects coordinates of a current location of a mobile object at each predetermined time and, based on a group of detected coordinates, creates a map of roads constituted by straight portions, non-straight portions continuous to the straight portions, and straight portions continuous to the non-straight portions.

CITATION LIST

Patent Documents

PATENT DOCUMENT 1: Japanese Patent No. 4125569
PATENT DOCUMENT 2: Japanese Patent No. 5749359

SUMMARY OF THE INVENTION

Technical Problem

In a case where a road is constituted only by an inlet straight portion, an arc portion continuous to the inlet straight portion, and an outlet straight portion continuous to the arc portion, when a vehicle travels along the road, the vehicle cannot travel smoothly at a connection point between the inlet straight portion and the arc portion and a connection point between the arc portion and the outlet straight portion, resulting in an increased possibility of side-slip of the vehicle and increased uncomfort of a passenger.

In particular, a vehicle equipped with a driving assistance device that assists a steering operation of a driver or performs the steering operation for the driver assists or performs the steering operation so that the vehicle travels along the road, resulting in an increased possibility of side-slip of the vehicle and increased uncomfort of a passenger.

Intersections each constituted only by an inlet straight portion, an arc portion continuous to the inlet straight portion, and an outlet straight portion continuous to the arc portion are present at about 200,000 locations with signals and at about 800,000 locations without signals. Thus, it is highly required to reduce side-slip of vehicles with reduction of uncomfort of passengers.

The present invention has been made in view of the foregoing situations, and has an object of creating a travel track on which a vehicle can travel smoothly.

Solution to the Problem

A travel track creation device according to one aspect of the present invention is a travel track creation device that creates a travel track on which a vehicle travels on a road and which includes an inlet straight portion, an arc portion continuous to the inlet straight portion, and an outlet straight portion continuous to the arc portion, the travel track creation device includes: a travel track creator that creates the travel track including an inlet straight track separated from an outer edge of the inlet straight portion by a predetermined distance toward a center side of the arc portion, an inlet clothoid track continuous to the inlet straight track and formed by connecting a first group of clothoid curves, an arc track continuous to the inlet clothoid track, an outlet clothoid track continuous to the ark track and formed by connecting a second group of clothoid curves, and an outlet straight track continuous to the outlet clothoid track and separated from an outer edge of the outlet straight portion by a predetermined distance toward the center side of the arc portion, wherein the travel track creator includes an arc creator that creates the arc track which is located further on a side opposite to the center side of the arc portion than a passing target point and a radius of which is as large as possible, the passing target point being separated from an inner edge of the arc portion by a predetermined distance toward the side opposite to the center side of the arc portion; and a clothoid creator that creates the inlet clothoid track in which a radius of a last tangential arc corresponds to a radius of the arc track and a start point of which is in contact with the inlet straight track and in which a direction angle of the start point corresponds to a direction angle of the inlet straight track, and the outlet clothoid track in which a radius of a last tangential arc corresponds to a radius of the arc track and which is in contact with the outlet straight track and in which a direction angle of a start point corresponds to a direction angle of the outlet straight track.

Advantages of the Invention

According to some aspects of the present invention, a travel track on which a vehicle can travel smoothly can be created advantageously.

BRIEF DESCRIPTION OF THE DRAWINGS

FIG. 2 is a view illustrating data of transition curve lengths according to the first embodiment.

DESCRIPTION OF EMBODIMENTS

A travel track creation device, a travel track creation method, a travel track creation program, a driving assistance device, and a driving assistance system according to embodiments of the present invention will be described in detail with reference to the drawings. These embodiments are not intended to limit the invention.

First Embodiment

Figure 1:
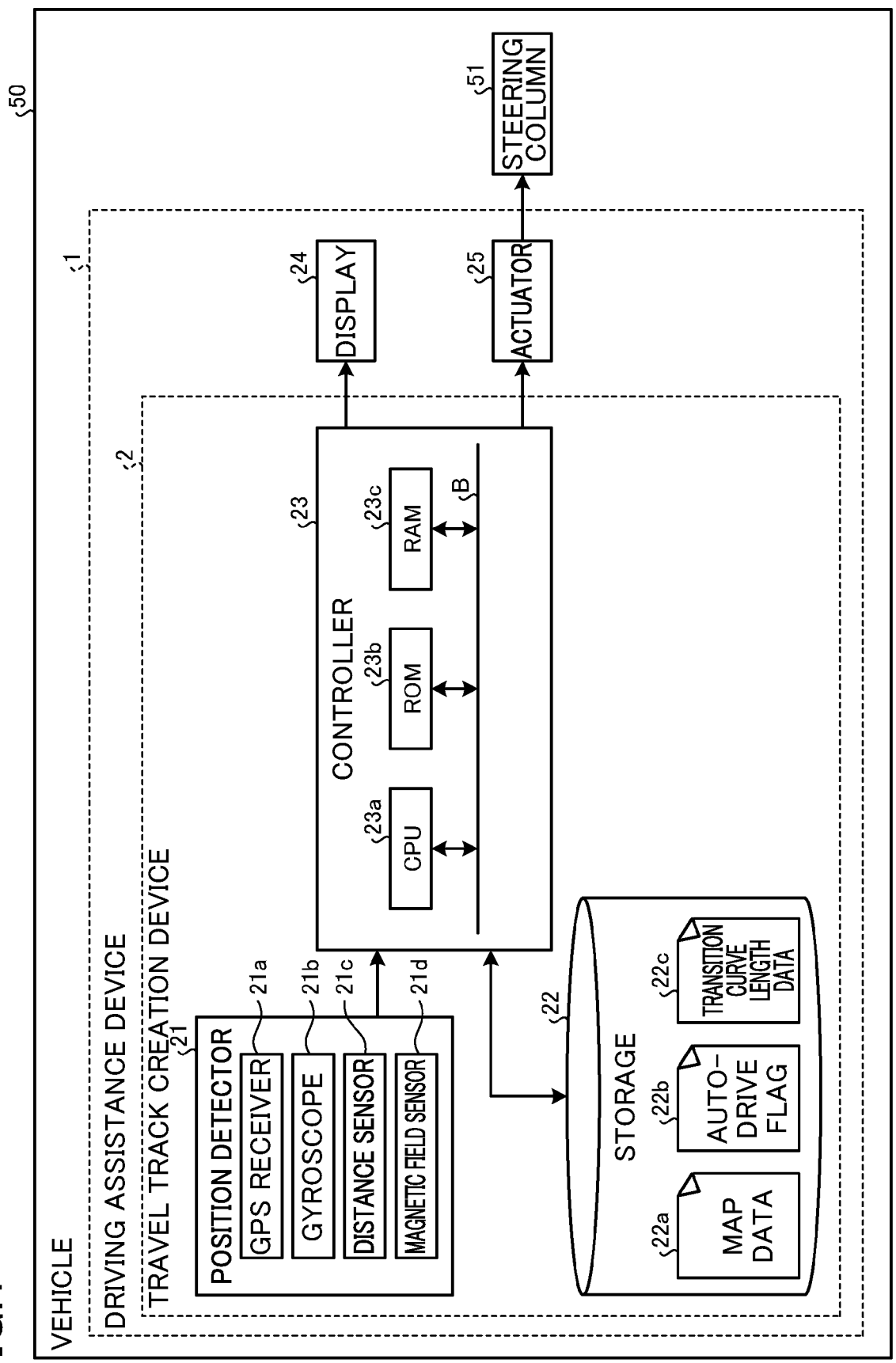
FIG. 1 is a view illustrating a configuration of a driving assistance device according to a first embodiment.

FIG. 1 is a view illustrating a configuration of a driving assistance device according to a first embodiment. This driving assistance device 1 is mounted on a vehicle 50.

The driving assistance device 1 includes a travel track creation device 2, a display 24, and an actuator 25.

The travel track creation device 2 creates a travel track where the vehicle 50 travels on a curve or an intersection including only an inlet straight portion, an arc portion continuous to the inlet straight portion, and an outlet straight portion continuous to the arc portion, and including none of an inlet clothoid portion and an outlet clothoid portion. The travel track includes an inlet straight track, an inlet clothoid track continuous to the inlet straight track, an arc track continuous to the inlet clothoid track, an outlet clothoid track continuous to the arc track, and an outlet straight track continuous to the outlet clothoid track.

Each of the inlet clothoid track and outlet clothoid track according to the present embodiment is not a single clothoid curve but a curve formed by connecting a plurality of clothoid curves. Each of the plurality of clothoid curves may be an egg-shaped clothoid curve. In the present embodiment, a curve formed by connecting a plurality of clothoid curves will be referred to as "multiple clothoid curve."

The travel track creation device 2 includes a position detector 21, a storage 22, and a controller 23.

The position detector 21 includes a GPS receiver 21a, a gyroscope 21b, a distance sensor 21c, and a magnetic field sensor 21d.

The GPS receiver 21a receives electric waves from an artificial satellite for a global positioning system (GPS), detects the position, orientation (traveling direction), velocity, and acceleration, for example, of the vehicle 50, and outputs detected results to the controller 23.

The gyroscope 21b is a sensor for detecting an angular velocity (orientation change amount) of the vehicle 50, and outputs a detection signal in accordance with an angular velocity of rotation movement applied to the vehicle 50, to the controller 23.

Based on the acceleration in the longitudinal direction of the vehicle 50, for example, the distance sensor 21c detects a distance of travel of the vehicle 50 and outputs the distance to the controller 23.

The magnetic field sensor 21d is an orientation sensor using a semiconductor, and outputs the detected orientation to the controller 23 based on north and south geomagnetisms generated on the earth.

The storage 22 stores map data 22a, an auto-drive flag 22b and a transition curve length data 22c. Examples of the storage 22 include a solid state drive (SSD) and a hard disk drive (HDD).

The map data 22a includes map data on a curve or an intersection including only an inlet straight portion, an arc portion continuous to the inlet straight portion, and an outlet straight portion continuous to the arc portion, and including none of an inlet clothoid portion and an outlet clothoid portion.

As the auto-drive flag 22b, "1" is set beforehand in a case where the driving assistance device 1 performs automatic operation of the vehicle 50, whereas "0" is set beforehand in a case where the driving assistance device 1 does not performs an automatic operation of the vehicle 50.

The transition curve data 22c is data in which the design speed of a road and a transition curve length are associated with each other.

FIG. 2 is a view illustrating data of transition curve lengths according to the first embodiment. In the present embodiment, the transition curve length data 22c follows the provision of Article 18, paragraph 3 of the Road Structure Order (Decree No. 320 of Oct. 29, 1980).

With reference to FIG. 2, the transition curve length data 22c associates a design speed of 120 [km/h] with a transition curve length of 100 [m], a design speed of 100 [km/h] with a transition curve length of 85 [m], a design speed of 80 [km/h] with a transition curve length of 70 [m], a design speed of 60 [km/h] with a transition curve length of 50 [m], a design speed of 50 [km/h] with a transition curve length of 40 [m], a design speed of 40 [km/h] with a transition curve length of 35 [m], a design speed of 30 [km/h] with a transition curve length of 25 [m], and a design speed of 20 [km/h] with a transition curve length of 20 [m].

Numerical values illustrated in FIG. 2 are examples and the present invention is not limited to these values. For example, the transition curve length may be longer than the length provided in the provision of Article 18, paragraph 3 of the Road Structure Order.

The travel track creation device 2 sets the arc length (distance) of each of the inlet clothoid track and the outlet clothoid track to the length of the transition curve length associated with the design speed of the road.

With reference to FIG. 2 again, the controller 23 includes a central processing unit (CPU) 23a, a read only memory (ROM) 23b, and a random access memory (RAM) 23c. The CPU 23a, the ROM 23b, and the RAM 23c are connected together through a bus B.

The CPU 23a executes a program stored in the ROM 23b while using the RAM 23c as a work area. The program may be stored in the storage 22.

Based on data output from the controller 23, the display 24 displays a map an image of a travel track on which the vehicle 50 travels. Examples of the display 24 include a liquid crystal display device and an organic electro luminescence (EL) display device.

The actuator 25 is connected to a steering column 51 of the vehicle 50. In a case where the driving assistance device 1 performs an automatic operation, the actuator 25 rotates the steering column 51 based on a control signal output from the controller 23. In this manner, the orientation (traveling direction) of the vehicle 50 changes. Examples of the actuator 25 include a motor and a hydraulic pump.

Figure 3:
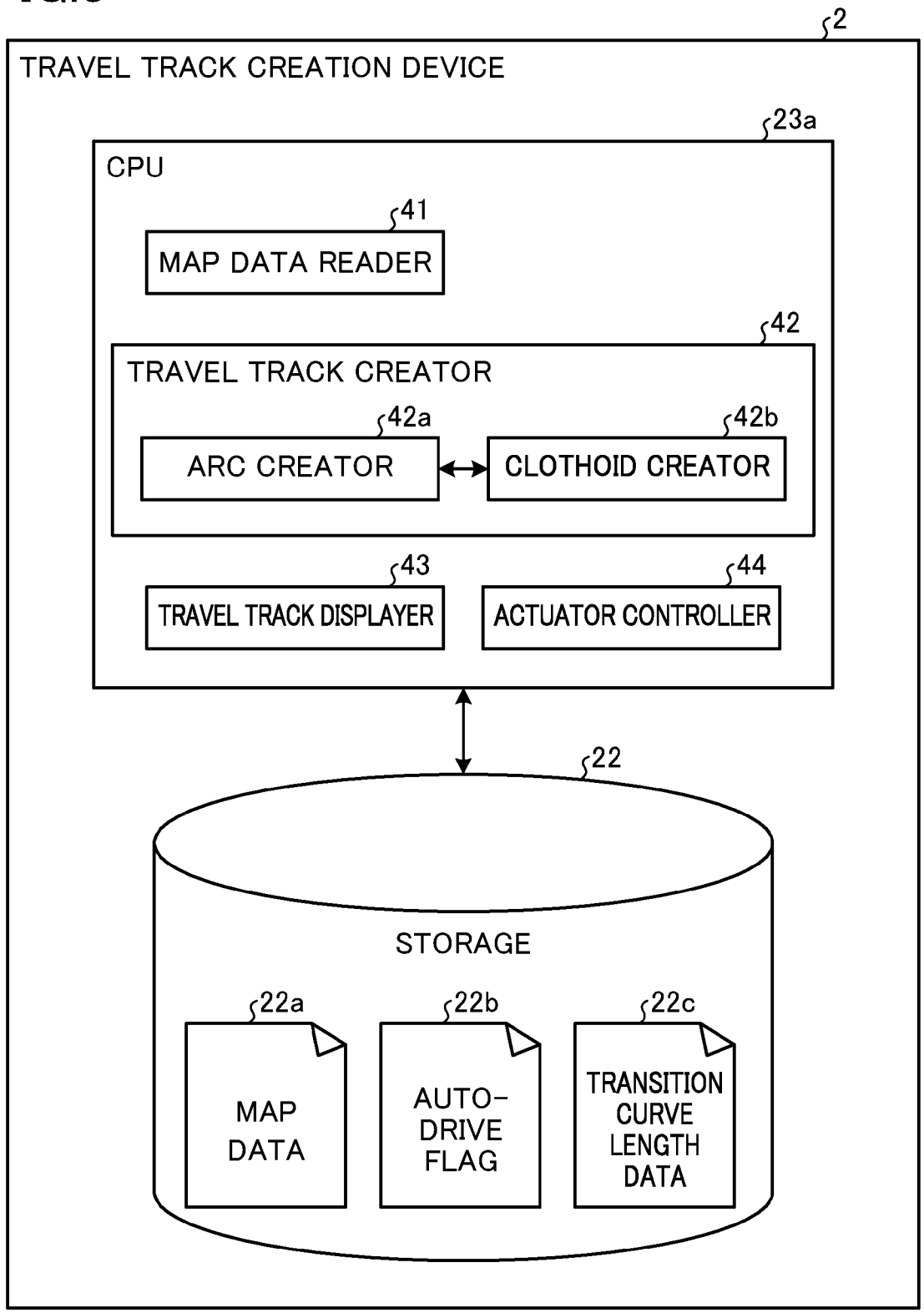
FIG. 3 is a view illustrating functional blocks of a travel track creation device according to the first embodiment.

FIG. 3 is a view illustrating functional blocks of the travel track creation device according to the first embodiment. The CPU 23a executes a program stored in the ROM 23b. In this manner, a map data reader 41, a travel track creator 42, a travel track displayer 43, and an actuator controller 44 are implemented. The travel track creator 42 includes an arc creator 42a and a clothoid creator 42b.

The map data reader 41 reads map data 22a from the storage 22.

The travel track creator 42 creates the travel track. The arc creator 42a creates the arc track of the travel track. The clothoid creator 42b creates the inlet clothoid track and the outlet clothoid track of the travel track.

The travel track displayer 43 causes the display 24 to display the travel track.

The actuator controller 47 operates the actuator 25 to thereby cause the steering column 51 to rotate so that the vehicle 50 travels on the travel track.

Comparative Example

Figure 4:
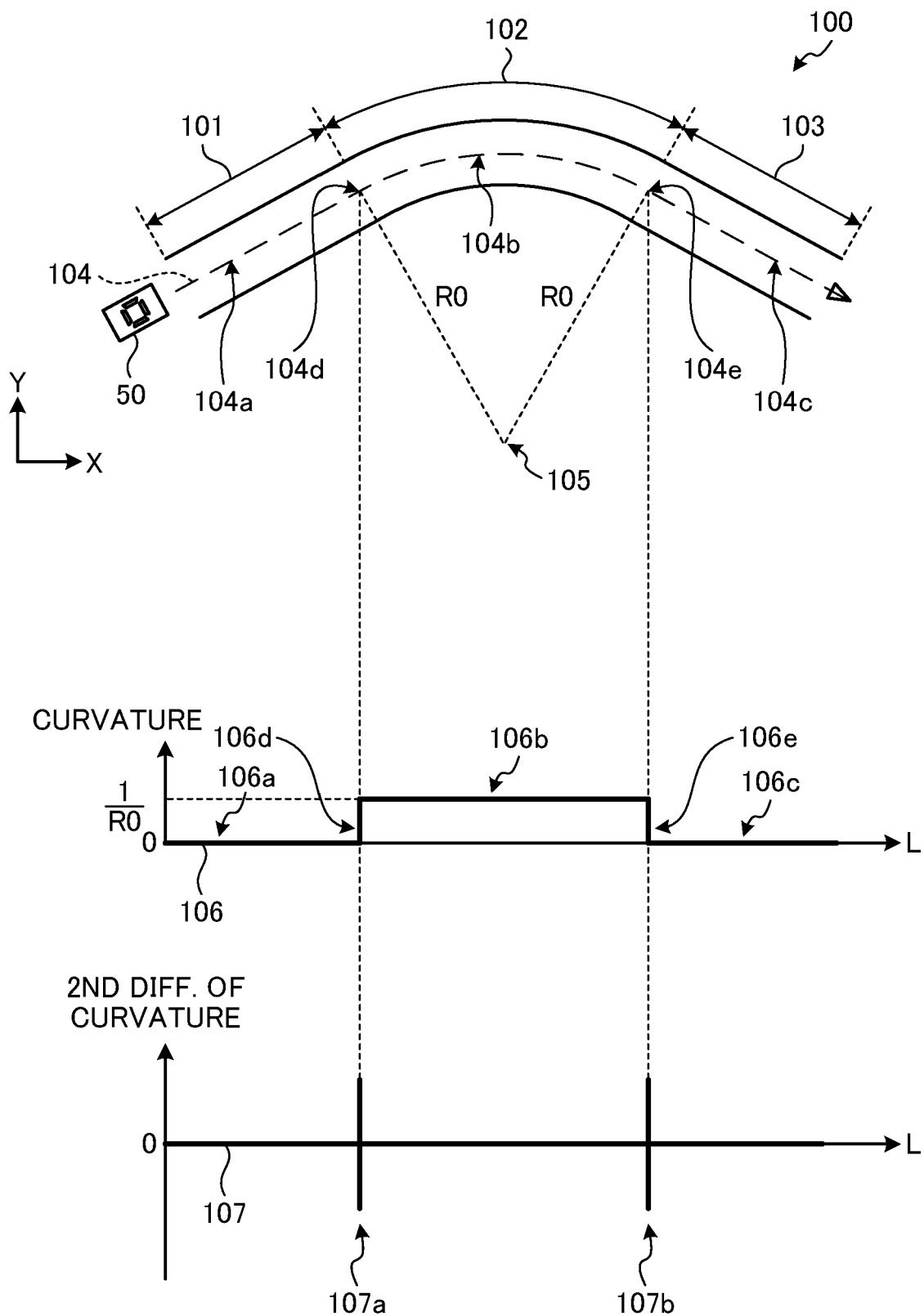
FIG. 4 is a view illustrating a travel track according to a comparative example.

FIG. 4 is a view illustrating a travel track according to a comparative example. In FIG. 4, the abscissa represents an X-axis direction, and the ordinate represents a Y-axis direction. A road 100 includes an inlet straight portion 101, an arc portion 102 continuous to the inlet straight portion 101, and an outlet straight portion 103 continuous to the arc portion 102. In FIG. 4, only one lane is shown, and an opposing lane is not shown.

A reference travel track 104 is a track on which the vehicle 50 travels along the road 100, and is exemplified by a center line of the road 100.

The reference travel track 104 includes an inlet straight track 104a in the inlet straight portion 101, includes an arc track 104b continuous to the inlet straight track 104a in the arc portion 102, and includes an outlet straight track 104c continuous to the arc track 104b in the outlet straight portion 103. The arc track 104b is an arc having a radius R0 about a point 105.

The inlet straight track 104a and the arc track 104b are connected to each other at a point 104d at the boundary between the inlet straight portion 101 and the arc portion 102. The arc track 104b and the outlet straight track 104c are connected to each other at a point 104e at the boundary between the arc portion 102 and the outlet straight portion 103.

The curvature in the inlet straight track 104a is 0 (zero). The curvature in the arc track 104b is 1/R0. The curvature in the outlet straight track 104c is 0 (zero).

A waveform 106 is a waveform representing a curvature of the reference travel track 104. The lateral direction L of the waveform 106 corresponds to a distance of the reference travel track 104. For easy understanding, the lateral direction L is contracted as appropriate.

The waveform 106 includes a first portion 106a corresponding to the inlet straight track 104a and having a curvature of 0 (zero), a second portion 106b corresponding to the arc track 104b and having a curvature of 1/R0, and a third portion 106c corresponding to the outlet straight track 104c and having a curvature of 0 (zero).

A portion between the first portion 106a and the second portion 106b serves as a first edge portion 106d, and a portion between the second portion 106b and the third portion 106c serves as a second edge portion 106e.

A waveform 107 which represents a second-order differentiation of a curvature of the reference travel track 104 includes a spike portion 107a at a point 104d and a spike portion 107b at a point 104e.

The curvature of the reference travel track 104 is direct proportional to a lateral acceleration (acceleration in the lateral direction) of the vehicle 50. The lateral direction refers to a direction orthogonal to the traveling direction of the vehicle 50. A first-order differentiation of the curvature of the reference travel track 104 is direct proportional to a lateral jerk of the vehicle 50. A second-order differentiation of the curvature of the reference travel track 104 is direct proportional to a change rate of a lateral jerk of the vehicle 50.

In a case where the vehicle 50 travels on the reference travel track 104, the vehicle 50 is steeply steered at the point 104d and the point 104e.

The waveform 106 representing the curvature of the reference travel track 104 is also a waveform representing the lateral acceleration of the vehicle 50 traveling on the reference travel track 104. Thus, in the first edge portion 106d and the second edge portion 106e, the lateral acceleration of the vehicle 50 rapidly changes, resulting in an increased possibility of side-slip of the vehicle 50 and increased uncomfort of a passenger.

Principle of the Embodiment

Figure 5:
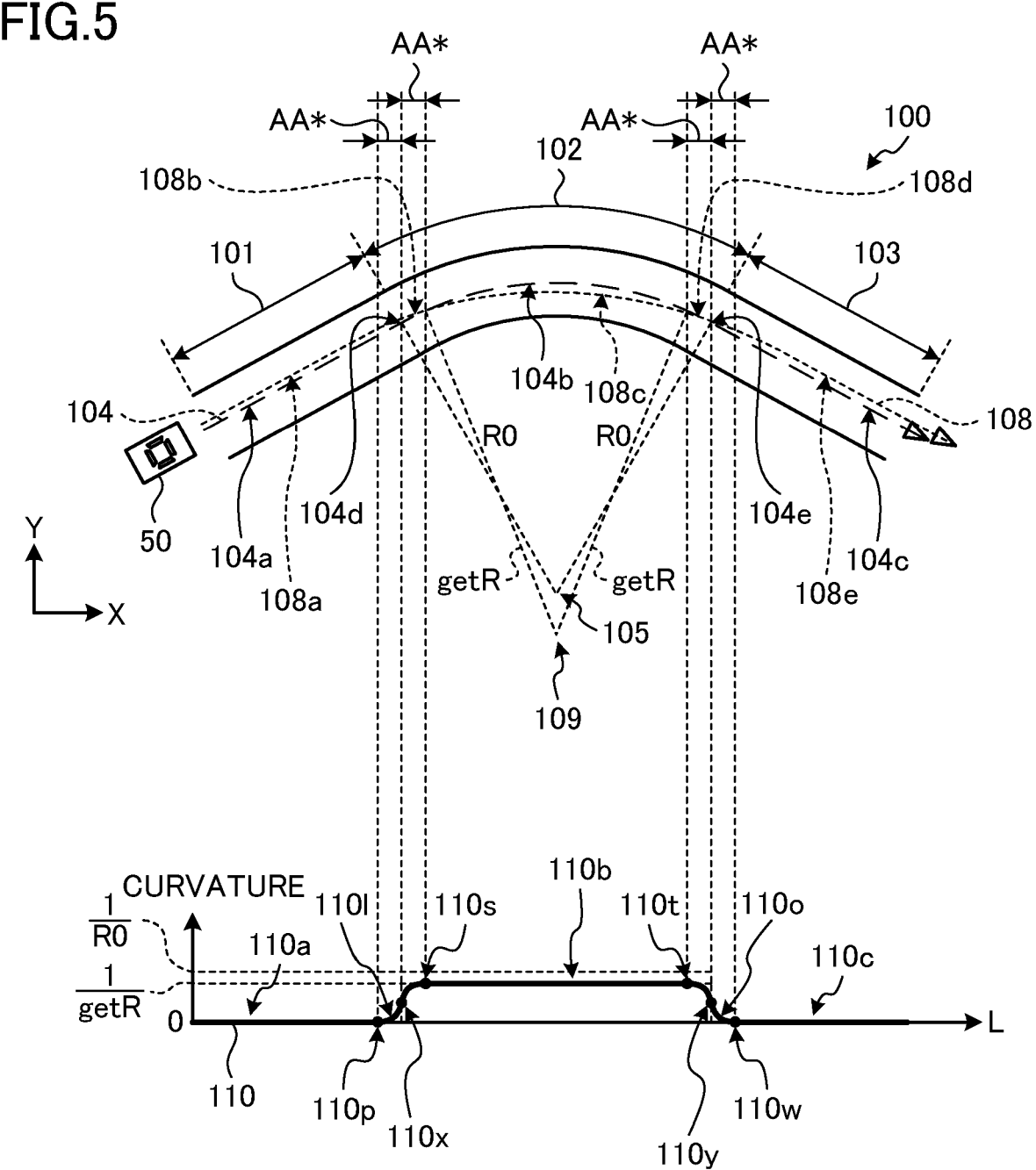
FIG. 5 is a view illustrating a principle of the travel track creation device according to the first embodiment.

FIG. 5 is a view illustrating a principle of the travel track creation device according to the first embodiment. FIG. 5 is a plan view showing an example of the travel track created by the travel track creation device according to the first embodiment. A travel track 108 shown in FIG. 5 is a track created by the travel track creation device 2.

The travel track 108 includes an inlet straight track 108a, an inlet clothoid track 108b continuous to the inlet straight track 108a, an arc track 108c continuous to the inlet clothoid track 108b, an outlet clothoid track 108d continuous to the arc track 108c, and an outlet straight track 108e continuous to the outlet clothoid track 108d.

The inlet straight track 108a is a straight line that is separated from an outer edge of the inlet straight portion 101 by a predetermined distance and is parallel to the inlet straight portion 101. The term "outer edge" refers to an edge on the side opposite to the center side of the curve (that is, on the side opposite the center of the curve), and the same applies to the following. The predetermined distance is exemplified by the sum of a left margin for keeping the safety and a left half of the vehicle width of the vehicle 50, but the present invention is not limited to this.

The inlet clothoid track 108b has an arc length (distance) of 2·AA*, which is the sum of AA* and AA*. The distance 2·AA* of the inlet clothoid track 108b is a transition curve length associated with the design speed of the road 100 in the transition curve length data 22c.

The arc track 108c is an arc of radius getR which is the same as radius R0 or greater than radius R0. The point 109 at the center of the arc track 108c is a location farther from the road 100 than the point 105.

The outlet clothoid track 108d has an arc length (distance) of 2·AA*, which is the sum of AA* and AA*. The distance 2·AA* of the outlet clothoid track 108d is a transition curve length associated with the design speed of the road 100 in the transition curve length data 22c.

The outlet straight track 108e is a straight line that is separated from an outer edge of the outlet straight portion 103 by a predetermined distance and is parallel to the outlet straight portion 103. The predetermined distance is exemplified by the sum of the left margin for keeping the safety and the left half of the vehicle width of the vehicle 50, but the present invention is not limited to this.

A waveform 110 is a waveform representing a curvature of the travel track 108. The lateral direction L of the waveform 108 corresponds to a distance of the travel track 108. For easy understanding, the lateral direction L is contracted as appropriate.

The waveform 110 includes a first portion 110a corresponding to the inlet straight track 108a and having a curvature of 0 (zero), and a second portion 110l corresponding to the inlet clothoid track 108b and having a curvature of a hyperbolic tangent function (tan h) curve.

The waveform 110 further includes a third portion 110b corresponding to the arc track 108c and having a curvature of 1/getR, a fourth portion 110o corresponding to the outlet clothoid track 108d and having a curvature of a hyperbolic tangent function curve, and a fifth portion 110c corresponding to the outlet straight track 108e and having a curvature of 0 (zero).

A tangent of the second portion 110l at a point 110p rearward in the traveling direction coincides with the first portion 110a and a tangent of the second portion 110l at a point 110s forward in the traveling direction coincides with the third portion 110b. An intermediate point 110x of the second portion 110l overlaps the first edge portion 106d.

A tangent of the fourth portion 110o at a point 110t rearward in the traveling direction coincides with the third portion 110b and a tangent of the fourth portion 110o at a point 110w forward in the traveling direction coincides with the fifth portion 110c. An intermediate point 110y of the fourth portion 110o overlaps the second edge portion 106e.

Figure 6:
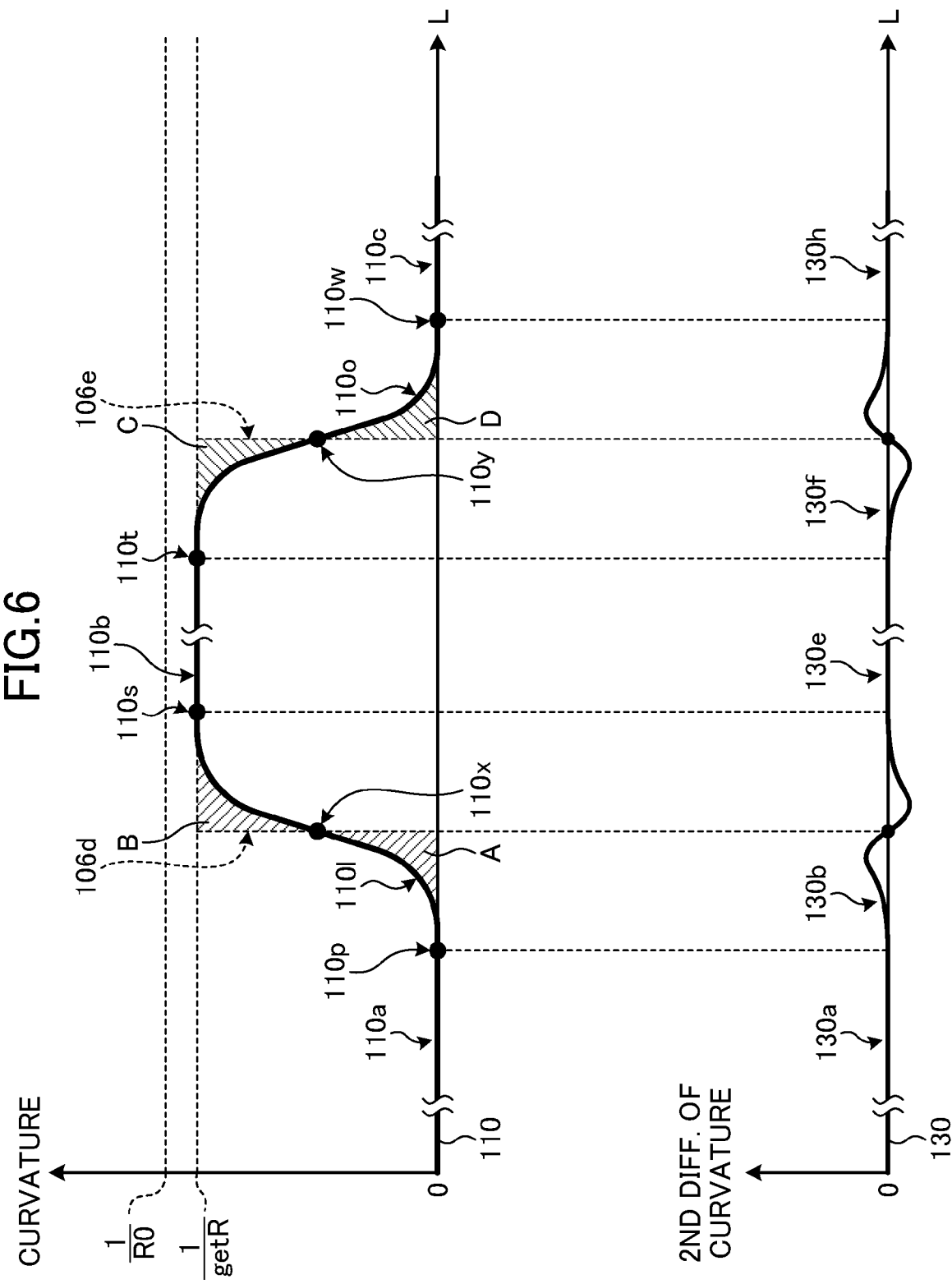
FIG. 6 is a view illustrating a principle of the travel track creation device according to the first embodiment.

FIG. 6 is a view illustrating a principle of the travel track creation device according to the first embodiment. FIG. 6 is a partially enlarged view illustrating a waveform of the curvature of the travel track created by the travel track creation device according to the first embodiment. FIG. 6 is an enlarged view illustrating the second portion 110l, the fourth curve portion 110o and the vicinities thereof illustrated in FIG. 5.

With reference to FIG. 6, an area of a region A defined by the L axis, the first edge portion 106d, and the waveform 110 is equal to an area of a region B defined by a straight line of 1/getR, the first edge portion 106d, and the waveform 110. An area of a region C defined by a straight line of 1/getR, the second edge portion 106e, and the waveform 110 is equal to an area of a region D defined by the L axis, the second edge portion 106e, and the waveform 110.

A waveform 130 is a waveform of second-order differentiation of the waveform 110. The curvature of the travel track 108 is direct proportional to a lateral acceleration of the vehicle 50. A first-order differentiation of the curvature of the travel track 108 is direct proportional to a lateral jerk of the vehicle 50. A second-order differentiation of the curvature of the travel track 108 is direct proportional to a change rate of a lateral jerk of the vehicle 50.

A hyperbolic tangent function can be expressed by the following Equation (1):

$$y = \tan h(x) \quad (1)$$

The first-order differentiation of Equation (1) can be expressed by the following Equation (2):

$$y' = \sec h^2(x) \quad (2)$$

The second-order differentiation of Equation (1) can be expressed by the following Equation (3):

$$y'' = -2 \sec h^2(x) \cdot \tan h(x) \quad (3)$$

As illustrated in FIG. 6, a first portion 110a of the waveform 110 from the origin O to the point 110p is 0 (zero). Thus, a portion 130a of the waveform 130 corresponding to the first portion 110a is 0 (zero).

The second portion 110l of the waveform 110 from the point 110p to the point 110s is a hyperbolic tangent function curve. The second-order differentiation of the hyperbolic tangent function is represented by Equation (3) described above. Thus, a second portion 130b of the waveform 130 corresponding to the second portion 110l is a curve represented by Equation (3).

The third portion 110b of the waveform 110 from the point 110s to the point 110t is a positive constant. Thus, a third portion 130e of the waveform 130 corresponding to the third point 110b is 0 (zero).

The fourth portion 110o of the waveform 110 from the point 110t to the point 110w is a hyperbolic tangent function curve. The second-order differentiation of the hyperbolic tangent function is represented by Equation (3) described above. Thus, a fourth portion 130f of the waveform 130 corresponding to the fourth portion 110o is a curve represented by Equation (3).

The fifth portion 110c of the waveform 110 from the point 110w is 0 (zero). Thus, a fifth portion 130h of the waveform 130 corresponding to the fifth point 110c is 0 (zero).

With reference to the comparative example of FIG. 4, the waveform 107 of second-order differentiation of the curvature of the reference travel track 104 includes the spike portion 107a and the spike portion 107b. At the spike portions 107a and 107b, a lateral jerk of the vehicle 50 rapidly changes, resulting in the possibilities of side-slip of the vehicle 50 and uncomfort of a passenger.

On the other hand, in the travel track 108 created by the travel track creation device 2 of the present embodiment, the waveform 130 smoothly changes in all the sections, as illustrated in FIG. 6. More specifically, the waveform 130 smoothly changes in an initial portion of the second portion 130b, an intermediate portion of the second portion 130b, an end portion of the second portion 130b, an initial portion of the fourth portion 130f, an intermediate portion of the fourth portion 130f, and an end portion of the fourth portion 130f.

Thus, the travel track creation device 2 can create a travel track on which a change rate of lateral jerk of the vehicle 50 smoothly changes. That is, the travel track creation device 2 can create the travel track on which the vehicle 50 can travel smoothly. In this manner, the travel track creation device 2 can reduce occurrence of side-slip of the vehicle 50 and can reduce uncomfort of a passenger.

In the present embodiment, the second portion 110l and the fourth portion 110o are hyperbolic tangent function curves, but the present invention is not limited to this example. Other examples of the first second portion 110l and the fourth portion 110o include sigmoid function curves.

The sigmoid function can be expressed by the following Equation (4):

$$y = (\tan h(x/2)+1)/2 \qquad (4)$$

Thus, even in a case where the second portion 110l and the fourth portion 110o are sigmoid function curves, the travel track creation device 2 can create a travel track on which a change rate of lateral jerk of the vehicle 50 smoothly changes in a manner similar to the case of hyperbolic tangent function curves. That is, the travel track creation device 2 can create the travel track on which the vehicle 50 can travel smoothly. In this manner, the travel track creation device 2 can reduce occurrence of side-slip of the vehicle 50 and can reduce uncomfort of a passenger.

Principle of Creating Multiple Clothoid Curve

The principle creating the multiple clothoid curve by the clothoid creator 42b will be described. In the following, the principle of the creation of the inlet clothoid track will be described. Since the outlet clothoid track can be created in the same way as the inlet clothoid track, the description of the creation of the outlet clothoid track will be omitted.

A function tan h (x) can be expressed by the following Equation (5):

$$\tanh(x) = \frac{e^x - e^{-x}}{e^x + e^{-x}} \qquad (5)$$

Figure 7:
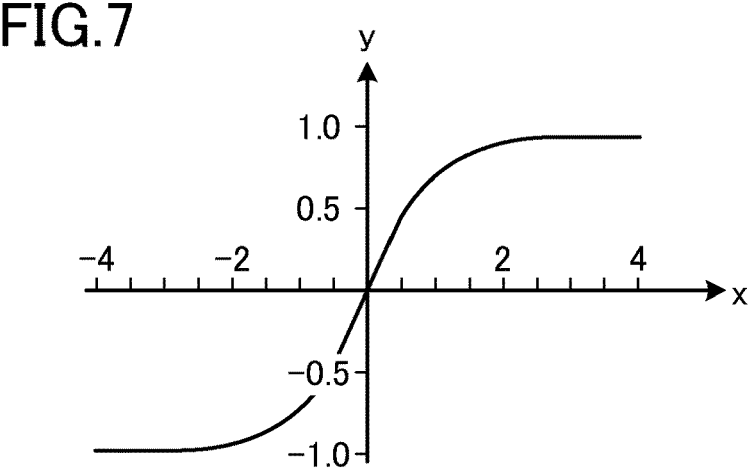
FIG. 7 is a view illustrating a principle of the travel track creation device according to the first embodiment.

FIG. 7 is a view illustrating a principle of the travel track creation device according to the first embodiment. FIG. 7 is a graph of y=tan h(x).

A function y=tan h(x) passes through the origin (0, 0) and has asymptotes y=−1.0 and y=1.0, and the range of values of y corresponding to x range [−2, 2] accounts for almost all of the possible values of y.

Here, the radius R of the arc portion 108c is assumed to be 100 [m]. That is, the curvature of the arc portion 108c is assumed to be 1/R=1/100. Further, the length of the inlet straight portion 101 is assumed to be L1=100 [m] and the arc length (distance) of the arc portion 102 is assumed to be L2=50 [m]. Further, the design speed of the road 100 is assumed to be 50 [km/h]. That is, the transition curve length is assumed to be 40 [m] (see FIG. 2), i.e. AA*=20 [m].

The hyperbolic tangent function is used in the form of the following Equation (6) so that the Y coordinate of the center of the curve of the hyperbolic tangent function corresponds to DD=1/(2·R) and the value of y varies within Y range [0, 2DD] and X range [−AA*, AA*]:

$$Y = DD + DD \cdot \tanh\left(\frac{2}{AA_*} X\right) \qquad (6)$$

Figure 8:
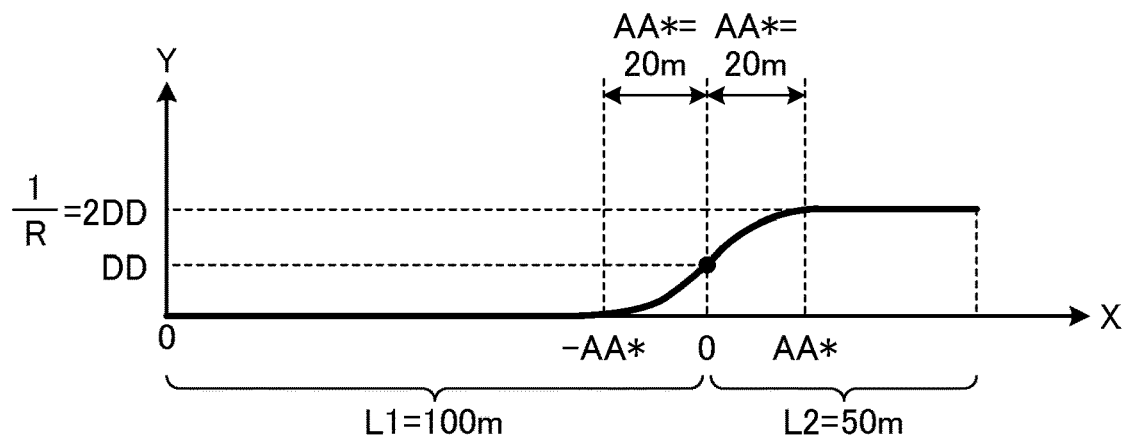
FIG. 8 is a view illustrating a principle of the travel track creation device according to the first embodiment.

FIG. 8 is a view illustrating a principle of the travel track creation device according to the first embodiment. FIG. 8 is a graph of the Equation (6).

In the Equation (6), when X=−AA*, the value of the parenthesis on the right side of the Equation (6) becomes −2, and the value of the Equation (6) approaches the asymptote Y=0. In the present embodiment, a curvature at a position where X=−AA* is assumed to be 0 (zero), although there is actually a slight gap between the value of the Equation (6) and the asymptote Y=0 when X=−AA*.

In the Equation (6), when X=AA*, the value of the parenthesis on the right side of the Equation (6) becomes 2, and the value of the Equation (6) approaches the asymptote Y=2DD. In the present embodiment, the curvature at a position where X=AA* is assumed to be 2DD, although there is actually a slight gap between the value of the Equation (6) and the asymptote Y=2DD when X=AA*.

The clothoid creator 42b equally divides the X range [−AA*, AA*] of the graph of FIG. 8 by num which is a predetermined division number. In other words, the clothoid creator 42b creates the multiple clothoid curve formed by connecting num clothoid curves (egg-shaped clothoid curves) whose curvatures are represented by the X range [−AA*, AA*] of the hyperbolic tangent function curve. In the present embodiment, num is set to 30, but this is an example, and the present invention is not limited to this value.

The arc length (distance) len of each of the num clothoid curves is expressed by the following Equation (7):

$$\text{Len} = (AA^* - (-AA^*))/\text{num} = 2AA^*/30 \qquad (7)$$

Let $K_i$ (i=0, . . . , num) be the curvature at each of the division locations obtained by equally dividing the X range [−AA*, AA*] of the graph of FIG. 8 into num pieces. $K_0$ is a curvature at a start point of a first clothoid curve. $K_1$ is a curvature at an end point of the first clothoid curve and a start point of a second clothoid curve. $K_{30}$ is a curvature at an end point of a 30th clothoid curve.

A radius of curvature $R_i$ at each of the start points and the end points of 30 clothoid curves is expressed by the following Equation (8):

$$R_i = 1/K_i \quad (8)$$

A radius of curvature at the start point of the first clothoid curve is $R_0=\infty$. A radius of curvature at the end point of the 30th clothoid curve is $R_{30}=R=100$.

A clothoid curve and an egg-shaped clothoid curve can be uniquely drawn if given a start point, a direction at the start point (direction $i_c=1$ or $-1$), a clothoid parameter A and a radius of curvature (a radius of curvature at the start point and a radius of curvature at the end point in the case of the egg-shaped clothoid curve). In the present embodiment, each of the 30 clothoid curves can be uniquely drawn if the clothoid parameter A is determined, since the arc lengths (distance) len of each of the 30 clothoid curves are the same.

A first clothoid parameter $A_1$ is expressed by the following Equation (9) from the formula of $A^2=RL$:

$$A_1 = \sqrt{R_1 \cdot \text{len}} \quad (9)$$

An i-th clothoid parameter $A_i$ (i=2, ..., num) is expressed by the following Equation (11) from the formula of Equation (10):

$$\text{len} = \frac{A_i^2}{R_i} - \frac{A_i^2}{R_{i-1}} \quad (10)$$

$$A_i = \sqrt{\frac{R_i R_{i-1} \text{len}}{R_{i-1} - R_i}} \quad (11)$$

Thus, if an argument R representing a radius of an arc is given from the arc creator 42a, the clothoid creator 42b can create multiple clothoid curve formed by connecting 30 clothoid curves by using a known formula for calculating a track (for example, a formula disclosed in the patent document 1) in a manner that a start point of the first clothoid curve is set to an end point of the inlet straight track, a direction angle of the start point of the first clothoid curve is set to a direction angle of the inlet straight track, a start point of the i-th (i=2, ..., num) clothoid curve is set to an end point of the (i−1)-th clothoid curve, and a direction angle of the start point of the i-th clothoid curve is set to a direction angle of the end point of the (i−1)-th clothoid curve.

Figure 9:
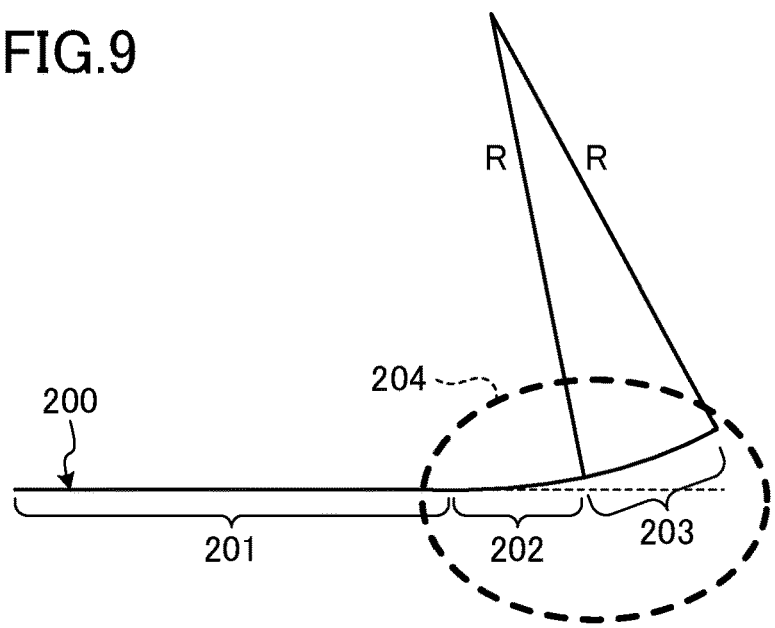
FIG. 9 is a view illustrating a principle of the travel track creation device according to the first embodiment.

FIG. 9 is a view illustrating a principle of the travel track creation device according to the first embodiment. FIG. 9 is a view illustrating an example of a travel track created by the travel track creation device according to the first embodiment.

Figure 10:
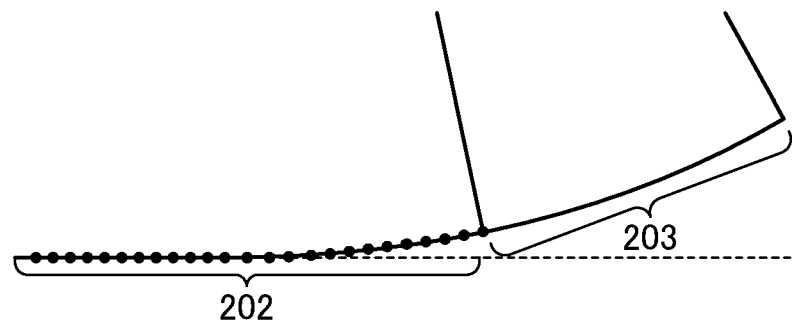
FIG. 10 is a view illustrating a principle of the travel track creation device according to the first embodiment.

FIG. 10 is a view illustrating a principle of the travel track creation device according to the first embodiment. FIG. 10 is an enlarged view of a region 204 of FIG. 9.

A travel track 200 includes a straight track 201, a multiple clothoid track 202 continuous to the straight track 201, and an arc track 203 continuous to the multiple clothoid track 202, whose radius R=100 [m]. A start point of the arc track 203 corresponds to an end point of the multiple clothoid track 202. A direction angle of a tangent to the start point of the arc track 203 is the same as a direction angle of the end point of the multiple clothoid track 202. A curvature of the arc track 203 is the same as a curvature at the end point of the multiple clothoid track 202.

The length of the straight track 201 is L1−AA*=100−20=80 [m]. The arc length (distance) of the multiple clothoid track 202 is 2·AA*=2·20=40 [m]. The arc length (distance) of the arc track 203 is L2−AA*=50−20=30 [m].

In the above description, the principle of the creation of the inlet clothoid track has been described. The outlet clothoid track can also be created in the same way as the inlet clothoid track. Specifically, the outlet clothoid track can be obtained as a multiple clothoid curve in a manner that a start point of the multiple clothoid curve is set to a start point of the outlet straight track, a direction angle of the start point of the multiple clothoid curve is set to a direction angle of the outlet straight track, and a last tangential arc of the multiple clothoid curve is set to the arc track Principle of Creating an Arc The principle of creating an arc by the arc creator 42a will be described.

Figure 11:
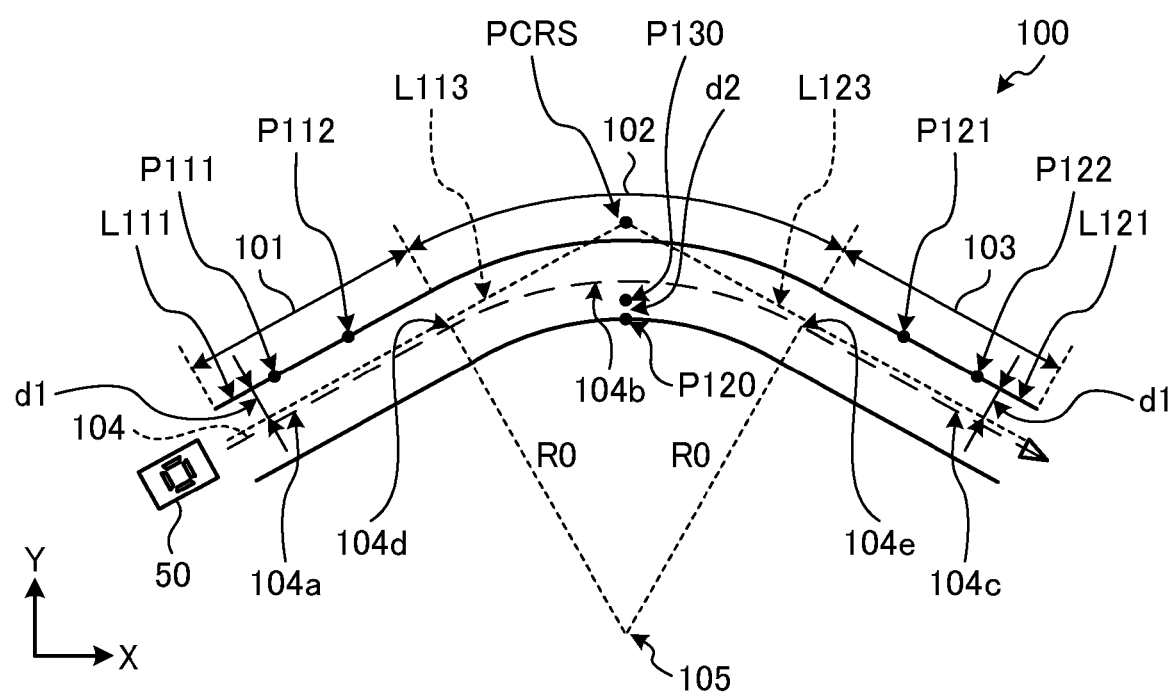
FIG. 11 is a view illustrating a principle of the travel track creation device according to the first embodiment.

FIG. 11 is a view illustrating a principle of the travel track creation device according to the first embodiment. The arc creator 42a creates a straight line L111 passing through surveying points P111 and P112 on the outer edge of the inlet straight portion 101. That is, the straight line L111 overlaps the outer edge of the inlet straight portion 101.

The arc creator 42a creates a straight line L113 which is separated by a predetermined distance d1 from the straight line L111 toward a center side and parallel to the straight line L111. The term "a center side" refers to a center side of a curve, and the same applies to the following. The predetermined distance d1 is exemplified by the sum of a left margin for keeping safety and a left half of the vehicle 50, but the present invention is not limited to this. The straight line L113 corresponds to the inlet straight track 108a.

The arc creator 42a creates a straight line L121 passing through surveying points P121 and P122 on the outer edge of the outlet straight portion 103. That is, the straight line L121 overlaps the outer edge of the outlet straight portion 103.

The arc creator 42a creates a straight line L123 which is separated by a predetermined distance d1 from the straight line L121 toward to a center side and parallel to the straight line L121. The straight line L123 corresponds to the outlet straight track 108e.

The arc creator 42a sets a point of intersection between the straight line L113 and the straight line L123 as a point PCRS.

The arc creator 42a sets, as a point P130, a point which is separated from a surveying point P120 on the center of an inner edge of the arc portion 102 by a predetermined distance d2 toward a side opposite to the center side of the arc portion 102. The term "inner edge" refers to an edge on the center side of the curve, and the same applies to the following. The predetermined distance d2 is exemplified by the sum of a right margin for keeping safety and a right half of the vehicle 50, but the present invention is not limited to this.

Figure 12:
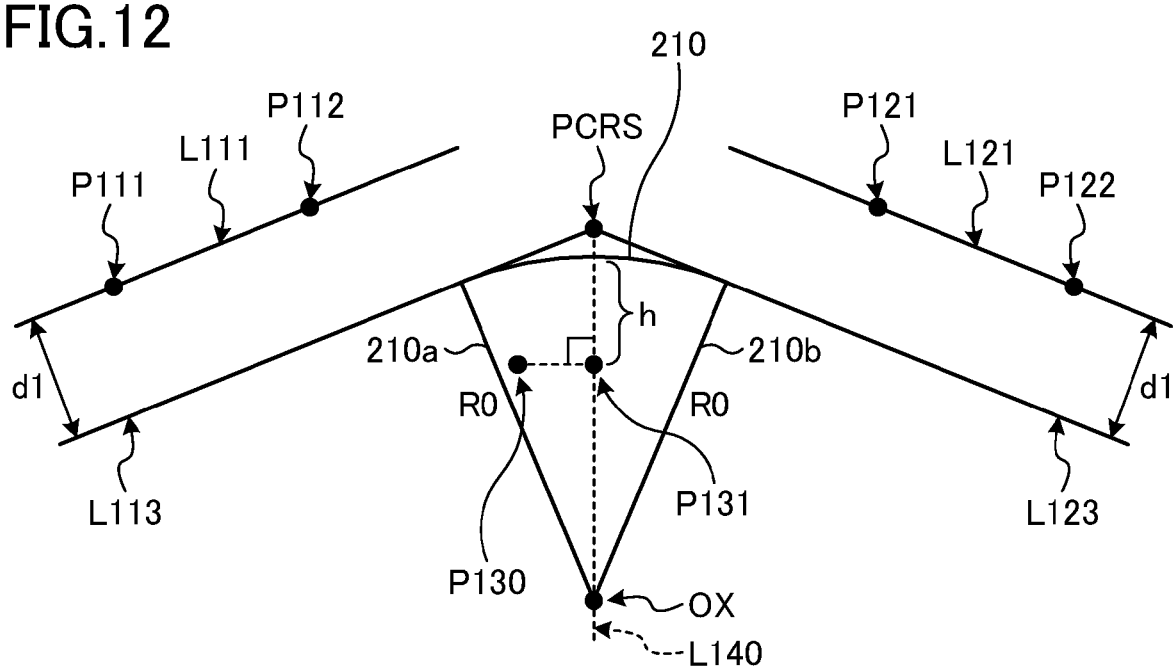
FIG. 12 is a view illustrating a principle of the travel track creation device according to the first embodiment.

FIG. 12 is a view illustrating a principle of the travel track creation device according to the first embodiment. The arc creator 42a creates a straight line L140 bisecting an inner angle (a corner on the center side of the curve) formed by the straight line L113 and the straight line L123. The point PCRS is on the straight line L140.

The arc creator 42a sets a foot of a perpendicular drawn from the point P130 to the straight line L140 as a point P131. The arc creator 42a sets the point P131 as a passing target point of the arc track 108c. If the surveying point P120 (see FIG. 11) is on the straight line L140, the point P130 and the point P131 are the same point.

An arc 210 is an arc having a radius R0 passing between the point PCRS and the point P131 and contacting the straight lines L113 and L123. A point OX is a center of the arc 210. The length of the radius 210a and 210b of the arc 210 is R0. A distance between the point P131 and the arc 210 is h.

Figure 13:
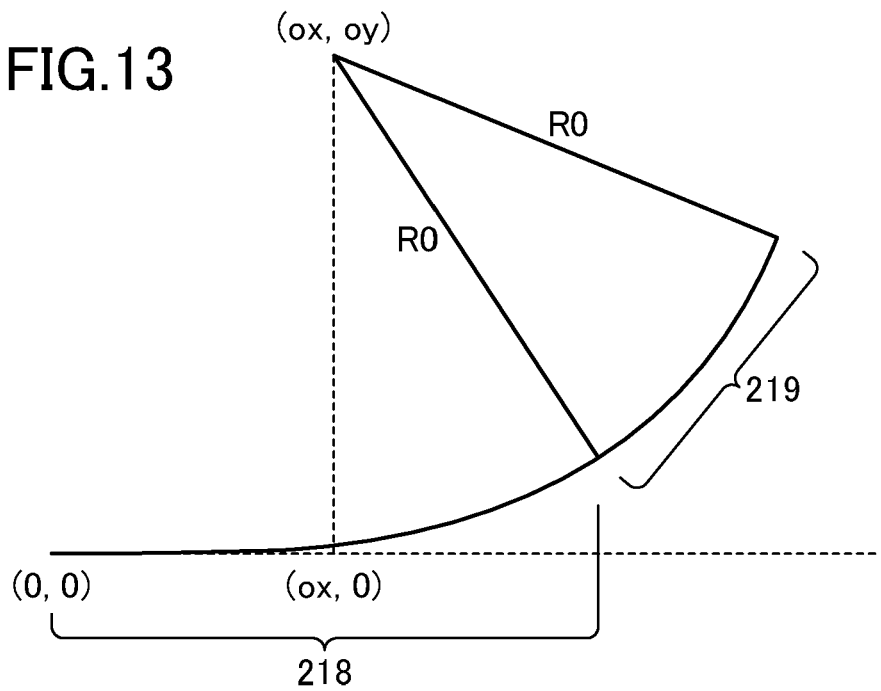
FIG. 13 is a view illustrating a principle of the travel track creation device according to the first embodiment.

FIG. 13 is a view illustrating a principle of the travel track creation device according to the first embodiment. As shown in FIG. 13, consider a multiple clothoid curve 218 in which a start point is the origin (0, 0), a vector direction is (1, 0), and a radius of a last tangential arc 219 is R0. A center of the last tangential arc 219 is (ox, oy). A start point of the last tangential arc 219 corresponds to an end point of the multiple clothoid curve 218. A direction angle of a tangent to the start point of the last tangential arc 219 is the same as a direction angle of the end point of the multiple clothoid curve 218. A curvature of the last tangential arc 219 is the same as a curvature of the end point of the multiple clothoid curve 218.

With reference to FIG. 13, the center (ox, oy) of the last tangential arc 219 is separated from a tangent y=0 of the multiple clothoid curve 218 by oy. The start point (0, 0) of the multiple clothoid curve 218 is separated from a foot point (ox, 0) of the perpendicular drawn from the center (ox, oy) of the last tangential arc 219 by ox.

Figure 14:
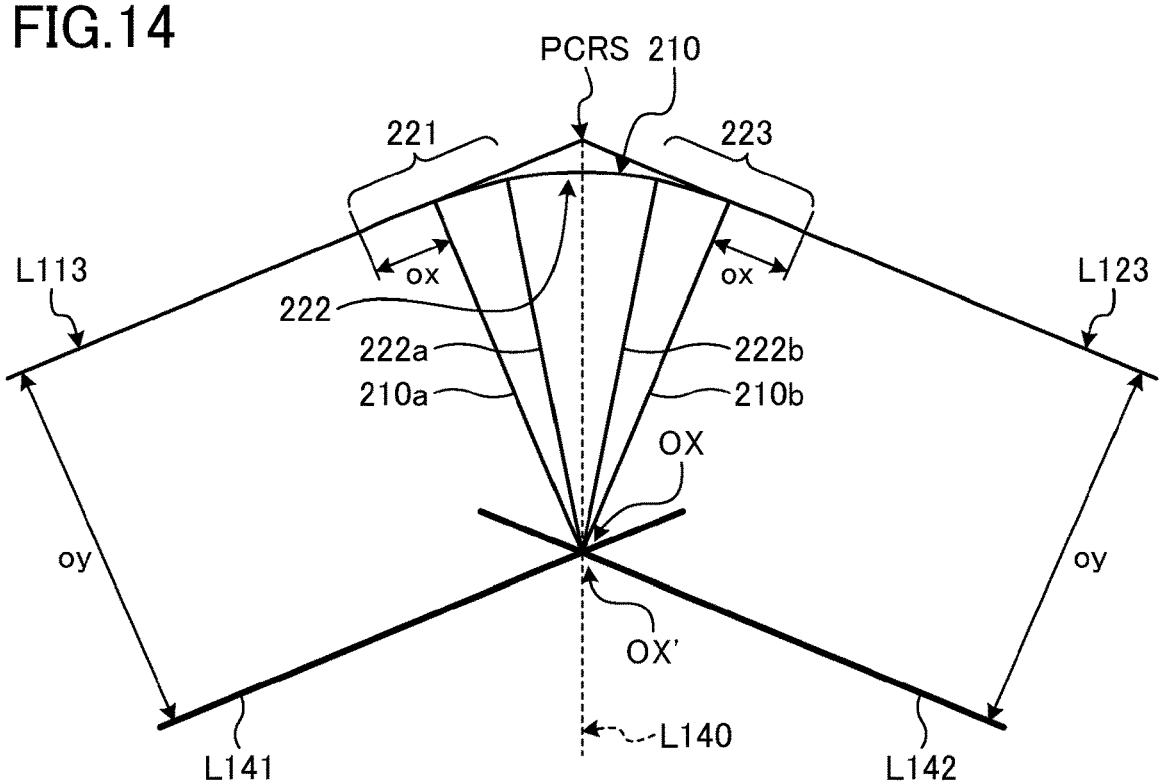
FIG. 14 is a view illustrating a principle of the travel track creation device according to the first embodiment.

FIG. 14 is a view illustrating a principle of the travel track creation device according to the first embodiment. In FIG. 14, an arc 222 having a radius R0, an inlet clothoid curve 221 which is in contact with the straight line L113 and the arc 222 as a last tangential arc, and an outlet clothoid curve 223 which is in contact with the straight line L123 and the arc 222 as a last tangential arc have been added to FIG. 12. The length of the radius 222a and 222b of the arc 222 is R0.

A center point OX' of the arc 222 is an intersection point of a straight line L141 and a straight line L142. The straight line L141 is separated by a distance oy from the straight line L113 toward to a center side and parallel to the straight line L113. The straight line L142 is separated by a distance oy from the straight line L123 toward to a center side and parallel to the straight line L123.

Figure 15:
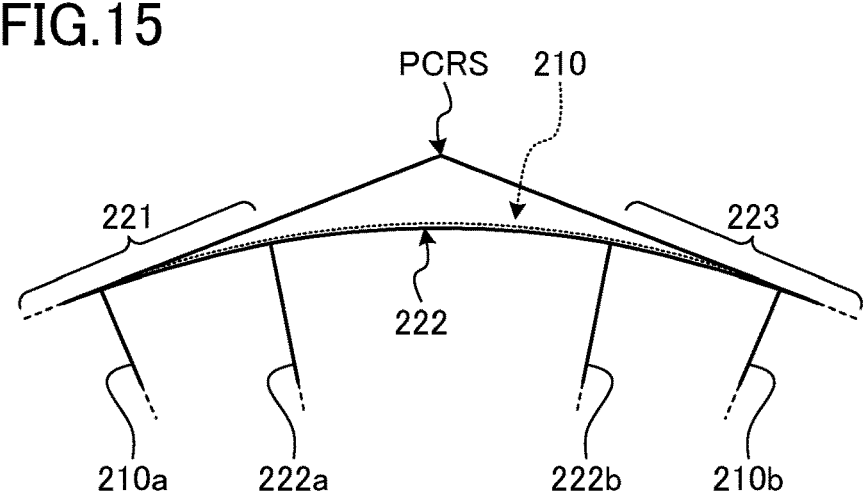
FIG. 15 is a view illustrating a principle of the travel track creation device according to the first embodiment.

FIG. 15 is a view illustrating a principle of the travel track creation device according to the first embodiment. FIG. 15 is an enlarged view of the vicinities of the point PCRS illustrated in FIG. 14. The arc 222 is located further on a center side than the arc 210.

Figure 16:
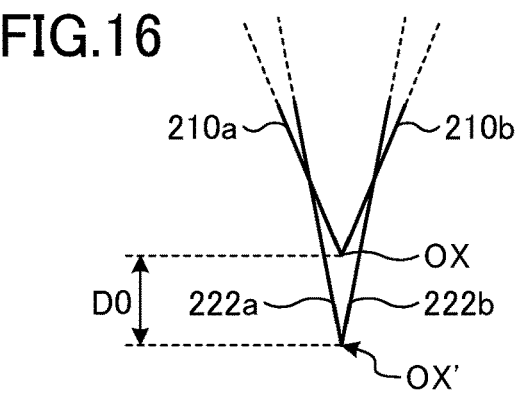
FIG. 16 is a view illustrating a principle of the travel track creation device according to the first embodiment.

FIG. 16 is a view illustrating a principle of the travel track creation device according to the first embodiment. FIG. 16 is an enlarged view of the vicinities of the point OX illustrated in FIG. 14. The point OX' is located further on a center side than the point OX. A distance between the point OX and the point OX' is D0.

Even when the radius of the arc 222 is the same as the radius R0 of the arc 210, the point OX' is located further on a center side than the point OX. Therefore, when the radius of the arc 222 is larger than the radius R0 of the arc 210, the point OX' moves further on a center side.

Figure 17:
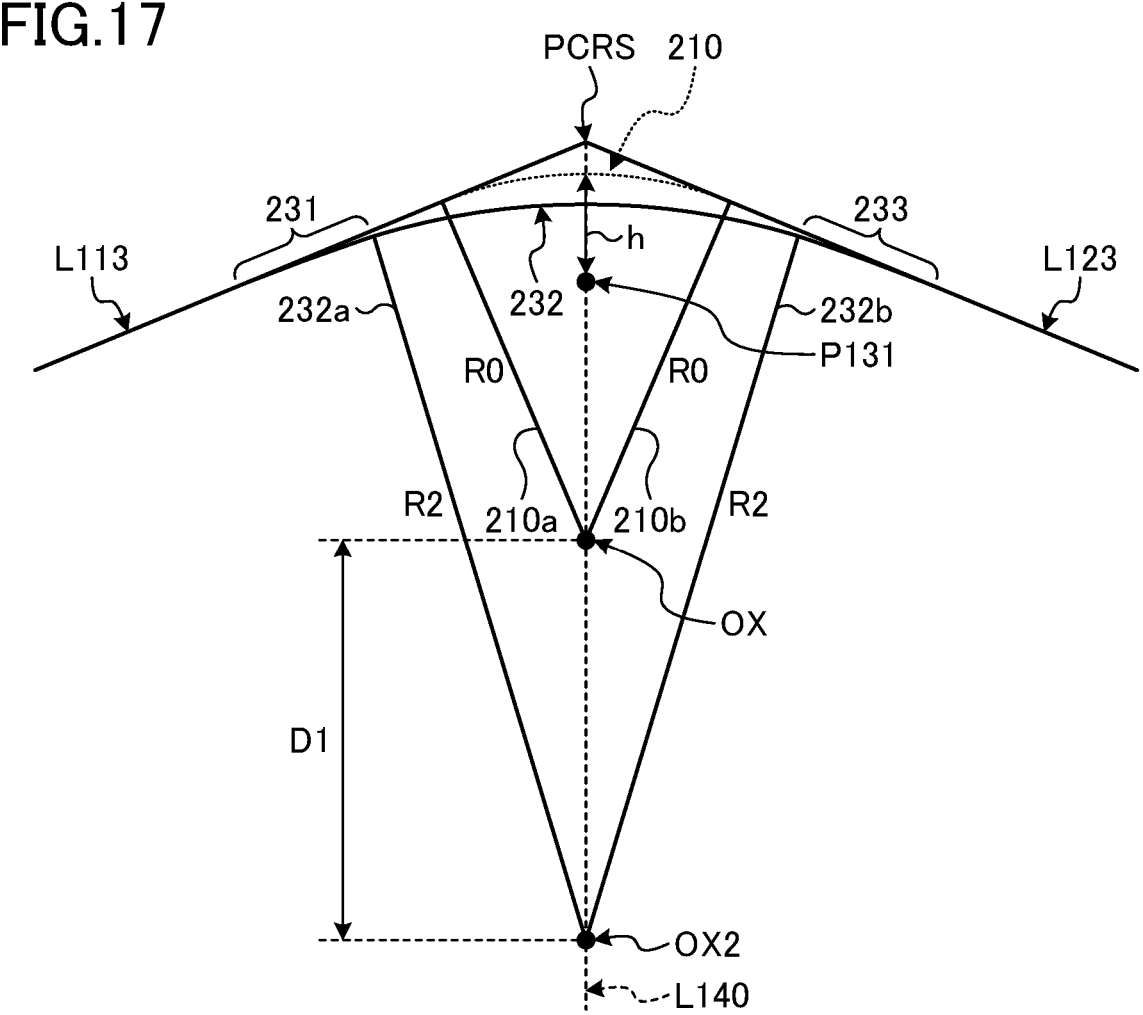
FIG. 17 is a view illustrating a principle of the travel track creation device according to the first embodiment.

FIG. 17 is a view illustrating a principle of the travel track creation device according to the first embodiment. In FIG. 17, an arc 232 having a radius R2 (R2>R0), an inlet clothoid curve 231 which is in contact with the straight line L113 and the arc 232 as a last tangential arc, and an outlet clothoid curve 233 which is in contact with the straight line L123 and the arc 232 as a last tangential arc have been added to FIG. 12. The length of the radius 232a and 232b of the arc 232 is R2. A point OX2 is a center of the arc 232. A distance between the point OX and the point OX2 is D1.

Figure 18:
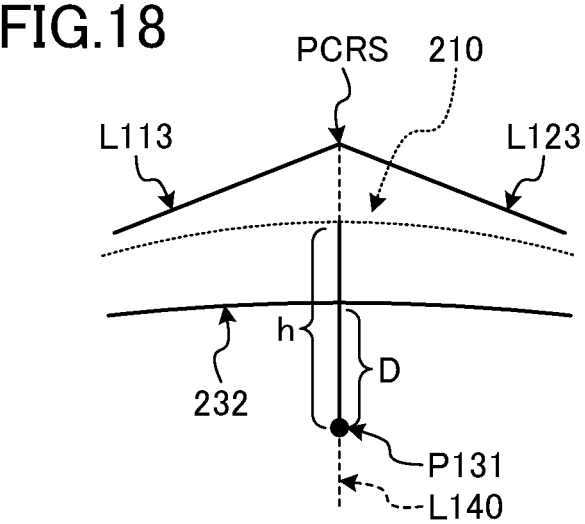
FIG. 18 is a view illustrating a principle of the travel track creation device according to the first embodiment.

FIG. 18 is a view illustrating a principle of the travel track creation device according to the first embodiment. FIG. 18 is an enlarged view of the vicinities of the point PCRS illustrated in FIG. 17.

A distance D between the point P131 and the arc 232 can be expressed by the following Equation (12):

$$D=h-(D1+R0-R2) \qquad (12)$$

In the case of R2=R0, the distance D1 between the point OX and the point OX2 is the same as the distance D0 between the point OX and the point OX', since the arc 232 coincides with the arc 222 (see FIGS. 14 and 15). In the case of R2=R0, the Equation (12) becomes as follow:

$$D=h-(D0+R0-R0)$$

$$=h-D0$$

Therefore, if the distance h is longer than the distance D0 between the point OX and the point OX', there is an answer passing through the point P131, that is, the travel track 108 can be created, while if the distance h is shorter than the distance D0 between the point OX and the point OX', there is no answer passing through the point P131, that is, the travel track 108 cannot be created. In the present embodiment, it is assumed that the point P131 is sufficiently far from the arc 222 and the distance h is longer than the distance D0 between the point OX and the point OX'.

If R2 is close to R0, the value of the Equation (12) is a positive value, and when R2 goes larger than R0, the value of the Equation (12) becomes a negative value, that is, the location of the arc 232 enters further on a center side of the curve beyond the passing target point P131. Therefore, when the value of the Equation (12) becomes a negative value, the arc creator 42a performs iterate calculation of the binary search (i.e. loop calculation) to calculate R2 before becoming of the value of the Equation (12) from positive to negative, that is, before entering of the location of the arc 232 further on a center side of the curve beyond the passing target point P131.

Specifically, the arc creator 42a creates an arc passing between the point PCRS and the point P131 and contacting the straight lines L113 and L123 by gradually increasing a radius from an initial radius (e.g. R0), and gives a parameter R2 representing a radius of the arc to the clothoid creator 42b, every time a new arc is created, to cause the clothoid creator 42b to create the inlet clothoid track and the outlet clothoid track. Once the inlet clothoid track and the outlet clothoid track have been created, the arc creator 42a can determine a location of the arc having a radius R2 to be connected to the inlet clothoid track and the outlet clothoid track. The arc creator 42a calculates the Equation (12), every time a new arc is created. When the value of the Equation (12) becomes a negative value, the arc creator 42a performs the above-described iterate calculation of the binary search to find the arc 232 having a maximal radius before becoming of the value of the Equation (12) from positive to negative.

Figure 19:
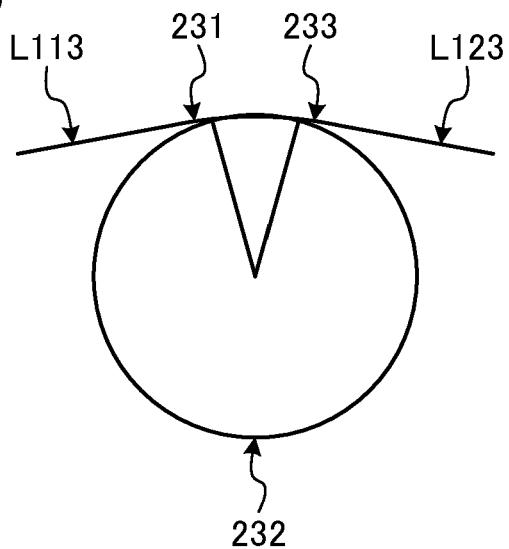
FIG. 19 is a view illustrating a principle of the travel track creation device according to the first embodiment.

FIG. 19 is a view illustrating a principle of the travel track creation device according to the first embodiment. The arc creator 42a does not recognize an answer shown in FIG. 19 such that a travel track including the straight line L113, the inlet clothoid curve 231, the arc 232, the outlet clothoid curve 233, and the straight line L123 makes one revolution as a correct answer.

Figure 20:
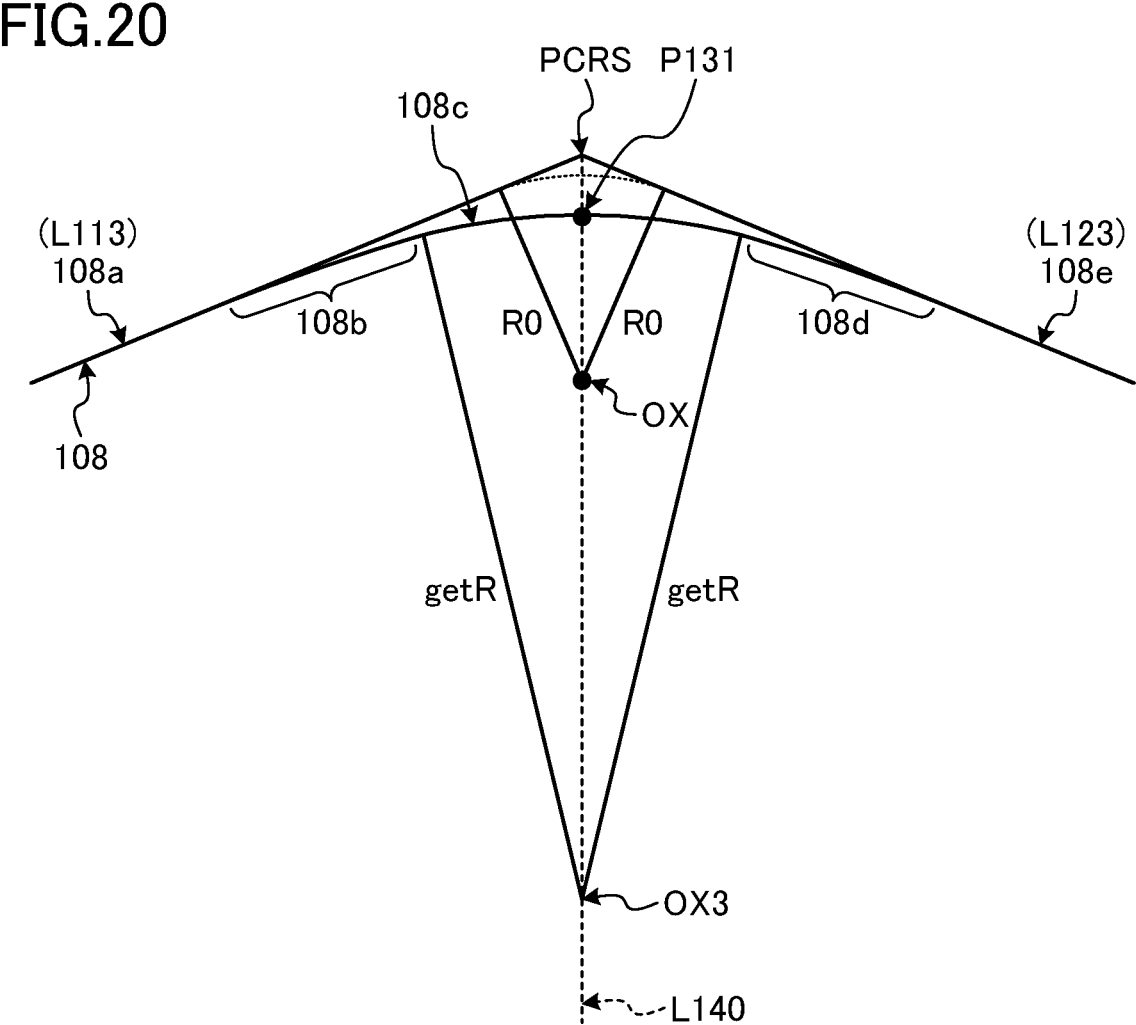
FIG. 20 is a view illustrating an example of a travel track created by the driving assistance device according to the first embodiment.

FIG. 20 is a view illustrating an example of a travel track created by the driving assistance device according to the first embodiment.

The travel track 108 includes the inlet straight track 108a (corresponding to the straight line L113 in FIG. 12), the inlet clothoid track 108b continuous to the inlet straight track 108a, the arc track 108c continuous to the inlet clothoid track 108b, the outlet clothoid track 108d continuous to the arc track 108c, and the outlet straight track 108e (corresponding to the straight line L123 in FIG. 12) continuous to the outlet clothoid track 108d.

The radius getR of the arc track 108c is a maximal radius before becoming of the value the Equation (12) from positive to negative as described above. A point OX 3 is the center of the arc track 108c and is on the straight line L140.

With reference to FIG. 3 again, the travel track displayer 46 overlays the travel track 108 on a map and displays the resulting map on the display 24. In the case of not performing an automatic operation of the vehicle 50, a user operates steering so that the vehicle 50 travels on the travel track 108 displayed on the display 24. In this manner, the lateral acceleration of the vehicle 50 smoothly changes. Accordingly, occurrence of side-slip of the vehicle 50 can be reduced, and uncomfort of a passenger can be reduced.

The actuator controller 44 determines whether the auto-drive flag 22b is "1" or not. If the actuator controller 44 determines that the auto-drive flag 22b is "1", the actuator controller 44 operates the actuator 25 to thereby cause the steering column 51 to rotate so that the vehicle 50 travels on the travel track 108. In this manner, the lateral acceleration of the vehicle 50 smoothly changes. That is, the driving assistance device 1 enables the vehicle 50 to travel smoothly. In this manner, the driving assistance device 1 can reduce the possibility of side-slip of the vehicle 50 and can reduce uncomfort of a passenger.

As described above, the driving assistance device 1 can create the travel track 108 on which the lateral acceleration of the vehicle 50 smoothly changes. That is, the driving assistance device 1 can create the travel track 108 on which the vehicle 50 can travel smoothly. In this manner, the driving assistance device 1 can reduce occurrence of side-slip of the vehicle 50 and can reduce uncomfort of a passenger.

The driving assistance device 1 can also create the travel track 108 from the reference travel track 104 that is a single-line road (polyline) in the map data 22a.

The driving assistance device 1 operates the actuator 25 to thereby the steering column 51 to rotate so that the vehicle 50 travels on the travel track 108. In a typical driving assistance device, to reduce the possibility of side-slip of the vehicle 50 and reduce uncomfort of a passenger, it is necessary to perform feedback control that detects a traveling state of the vehicle 50 and adjusts the amount of control. On the other hand, the driving assistance device 1 can perform feedforward control so that the vehicle 50 can travel on the travel track 108, and thus, the configuration of the driving assistance device 1 can be simplified and the driving assistance device 1 can be manufactured at low costs.

Second Embodiment

Figure 21:
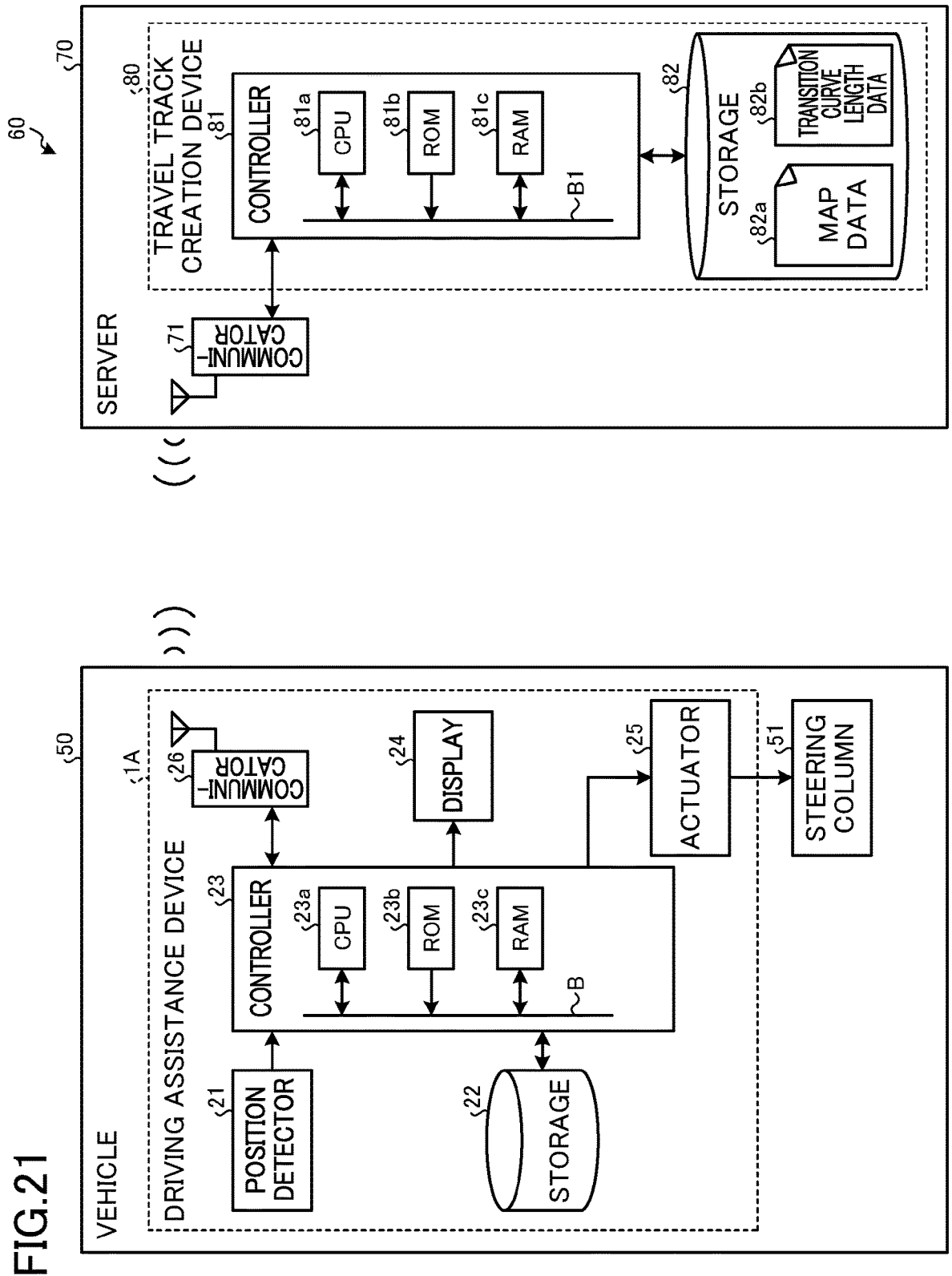
FIG. 21 is a view illustrating a configuration of a driving assistance system according to a second embodiment.

FIG. 21 is a view illustrating a configuration of a driving assistance system according to a second embodiment. Components similar to those described in the first embodiment are denoted by the same reference characters, and description thereof will not be repeated.

A driving assistance system 60 includes a driving assistance device 1A mounted on a vehicle 50 and a server 70.

The driving assistance device 1A further includes a communicator 26 for performing wireless communication with the server 70, in addition to a position detector 21, a storage 22, a controller 23, a display 24, and an actuator 25 that are components of the driving assistance device 1 according to the first embodiment. Examples of the wireless communication include wideband code division multiple access (W-CDMA) and long term evolution (LTE).

The server 70 includes a communicator 71 for performing wireless communication with the driving assistance device 1A and a travel track creation device 80. The travel track creation device 80 includes a controller 81 and a storage 82.

The controller 81 includes a CPU 81a, a ROM 81b, and a RAM 81c. The CPU 81a, the ROM 81b, and the RAM 81c are connected to each other through a bus B1.

The CPU 81a executes a program stored in the ROM 81b while using the RAM 81c as a work area. The program may be stored in the storage 82.

The storage 82 stores map data 82a and a transition curve length data 82b. Examples of the storage 82 include an SSD or an HDD.

Figure 22:
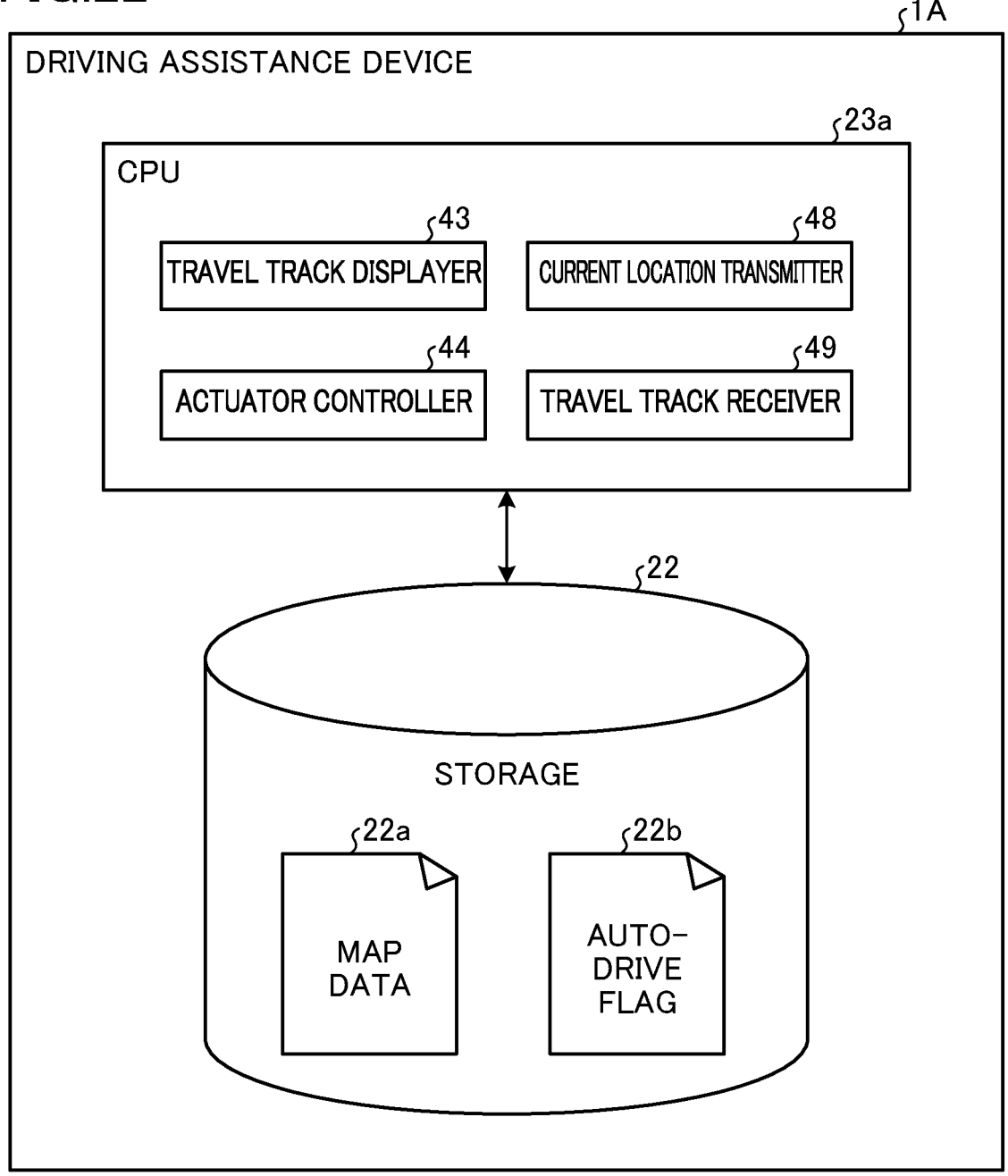
FIG. 22 is a view illustrating functional blocks of a driving assistance device according to the second embodiment.

FIG. 22 is a view illustrating functional blocks of the driving assistance device according to the second embodiment. The CPU 23a executes a program stored in the ROM 23b. In this manner, a travel track displayer 43, an actuator controller 44, a current location transmitter 48, and a travel track receiver 48 are implemented.

The current location transmitter 48 transmits a current location of the vehicle 50 to the server 70.

The travel track receiver 49 receives a travel track from the server 70.

Figure 23:
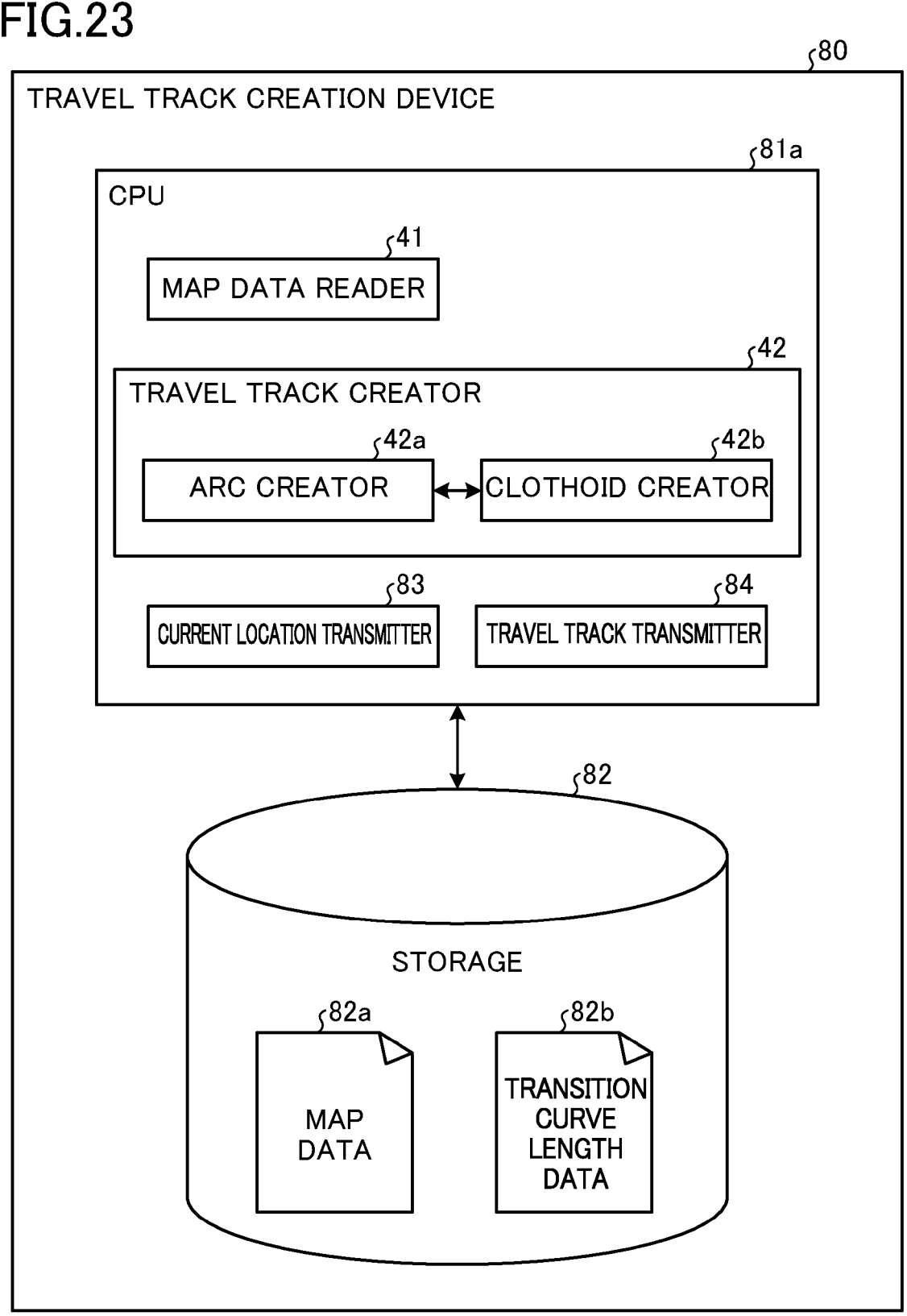
FIG. 23 is a view illustrating functional blocks of a travel track creation device according to the second embodiment.

FIG. 23 is a view illustrating functional blocks of a travel track creation device according to the second embodiment. The CPU 81a executes a program stored in the ROM 81b. In this manner, a map data reader 41, a travel track creator 42, a current location receiver 83, and a travel track transmitter 84 are implemented.

The current location receiver 83 receives a current location of the vehicle 50 from the driving assistance device 1A.

The travel track transmitter 84 transmits a travel track 108 to the driving assistance device 1A.

Figure 24:
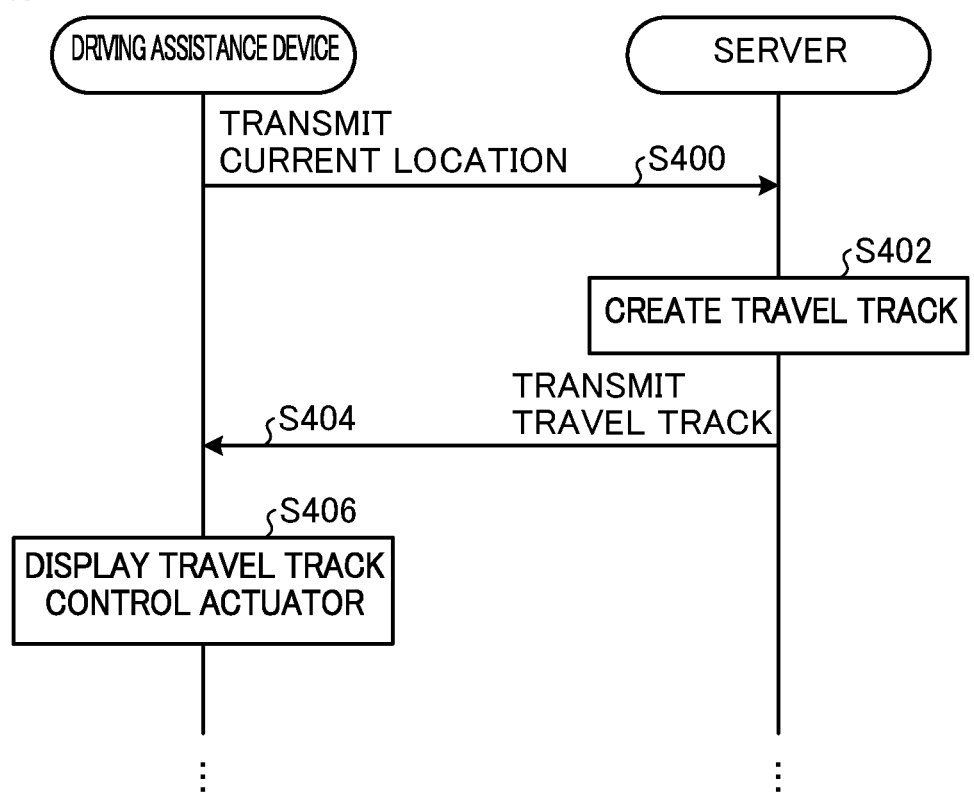
FIG. 24 is a sequence diagram depicting an operation of the driving assistance system according to the second embodiment.

FIG. 24 is a sequence diagram depicting an operation of the driving assistance system according to the second embodiment. The driving assistance device 1A starts processes shown in FIG. 24 when the distance between the vehicle 50 and a curve or an intersection reaches a predetermined distance.

In step S400, the current location transmitter 48 of the driving assistance device 1A transmits data indicating the current location of the vehicle 50 to the server 70. The current location receiver 83 of the server 70 receives the data indicating the current location of the vehicle 50 from the driving assistance device 1A.

In step S402, the travel track creator 42 of the server 70 create a travel track 108 including an inlet straight track 108a, an inlet clothoid track 108b continuous to the inlet straight track 108a, an arc track 108c continuous to the inlet clothoid track 108b, an outlet clothoid track 108d continuous to the arc track 108c, and an outlet straight track 108e continuous to the outlet clothoid track 108d.

A travel track creation method in step S402 is similar to a travel track creation method described in the first embodiment.

In step S404, the travel track transmitter 84 of the server 70 transmits the travel track 108 to the driving assistance device 1A. The travel track receiver 49 of the driving assistance device 1A receives the travel track 108 from the server 70.

In step S406, the travel track displayer 43 of the driving assistance device 1A overlays the travel track 108 on a map and displays the resulting map on the display 24. If the actuator controller 44 of the driving assistance device 1A determines that an auto-drive flag 22b is "1," the actuator controller 44 operates the actuator 25 to thereby cause the steering column 51 to rotate so that the vehicle 50 travels on the travel track 108.

In the driving assistance system 60, the travel track 108 can be created in the server 70. Thus, the necessity for creating a travel track 108 in the driving assistance device 1A mounted on the vehicle 50 can be eliminated so that a processing load of the CPU 23a of the driving assistance device 1A can be reduced.

For demands in terms of packaging or reduction of power consumption, the CPU 23a mounted on the vehicle 50 has a low processing capacity in some cases. In the driving assistance system 60, however, a travel track 108 can be created in the server 70. Thus, even with a low processing capacity of the CPU 23a, the driving assistance system 60 can create a travel track 108 including an inlet straight track 108a, an inlet clothoid track 108b continuous to the inlet straight track 108a, an arc track 108c continuous to the inlet clothoid track 108b, an outlet clothoid track 108d continuous to the arc track 108c, and an outlet straight track 108e continuous to the outlet clothoid track 108d. In this manner, the driving assistance system 60 can reduce the possibility of side-slip of the vehicle 50 and can reduce uncomfort of a passenger.

Third Embodiment

Figure 25:
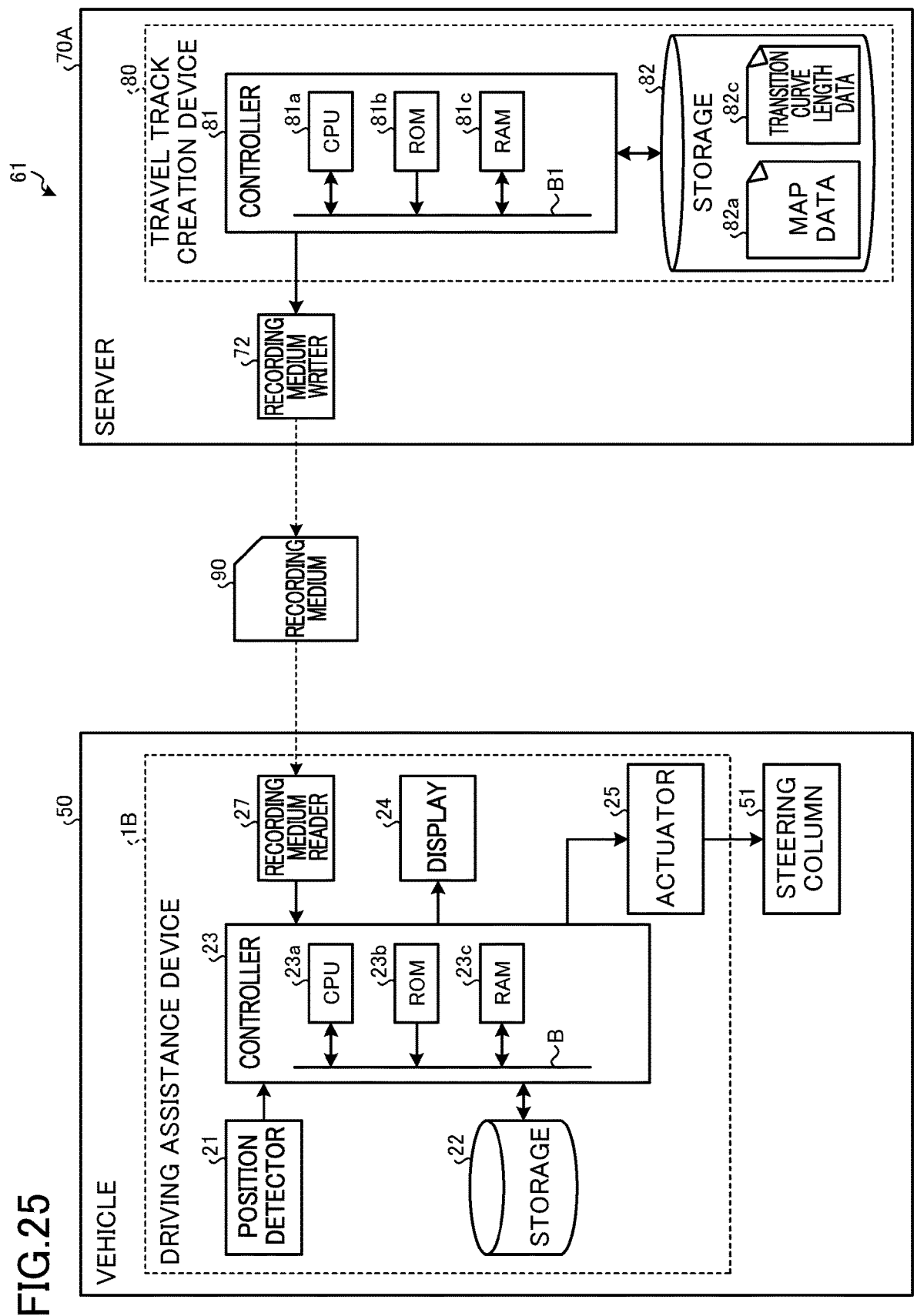
FIG. 25 is a view illustrating a configuration of a driving assistance system according to a third embodiment.
Figure 26:
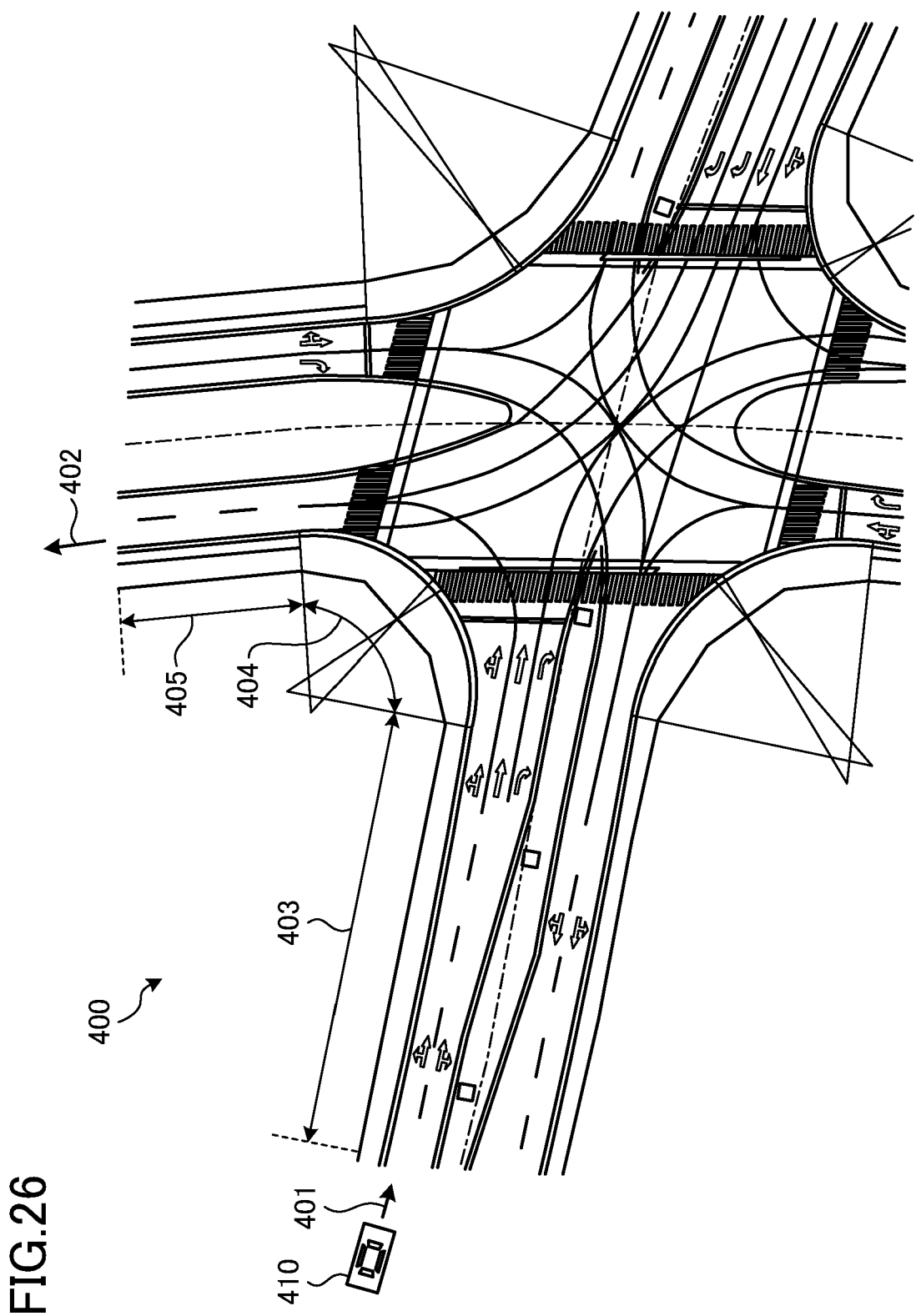
FIG. 26 is a plan view illustrating an example of an intersection.

FIG. 25 is a view illustrating a configuration of a driving assistance system according to a third embodiment. Components similar to those described in the first or second embodiment are denoted by the same reference characters, and description thereof will not be repeated.

A driving assistance system 61 includes a driving assistance device 1B mounted on a vehicle 50 and a server 70A.

The driving assistance device 1B further includes a recording medium reader 27 for reading data recorded on a recording medium 90, in addition to a position detector 21, a storage 22, a controller 23, a display 24, and an actuator 25 that are components of the driving assistance device 1 according to the first embodiment.

The server 70A includes a recording medium writer 72 for writing data on the recording medium 90 and a travel track creation device 80.

Examples of the recording medium 90 include an SD card (registered trademark), a universal serial bus (USB) memory, and a digital versatile disc (DVD).

The travel track creation device 80 creates a travel track 108 including an inlet straight track 108a, an inlet clothoid track 108b continuous to the inlet straight track 108a, an arc track 108c continuous to the inlet clothoid track 108b, an outlet clothoid track 108d continuous to the arc track 108c, and an outlet straight track 108e continuous to the outlet clothoid track 108d for each curve or intersection in all the regions in Japan and records the travel track on the recording medium 90.

A user of the vehicle 50 brings the recording medium 90 into the vehicle 50 and inserts the recording medium 90 in the recording medium reader 27 of the driving assistance device 1B. In the driving assistance device 1B, a travel track 108 recorded on the recording medium 90 may be installed or copied in the storage 22. In this manner, the user can remove the recording medium 90.

When the distance between the vehicle 50 and a curve or an intersection reaches a predetermined distance, the driving assistance device 1B reads a travel track 108 from the recording medium 90 or the storage 22, overlays the travel track 108 on a map, and displays the resulting map on the display 24. If it is determined that an auto-drive flag 22b is "1," the driving assistance device 1B operates the actuator 25 to thereby cause the steering column 51 to rotate so that the vehicle 50 travels on the travel track 108.

The driving assistance system 61 can create a travel track 108 in the server 70A. Thus, the necessity for creating a travel track 108 in the driving assistance device 1B mounted on the vehicle 50 can be eliminated so that a processing load of the CPU 23a of the driving assistance device 1B can be reduced.

The driving assistance system 61 can eliminate the necessity for wireless communication, as compared to the driving assistance system 60 according to the second embodiment. As a result, the driving assistance system 61 can reduce manufacturing costs for systems, and can reduce communication costs, that is, running costs.

The configurations of the foregoing embodiments are merely examples of the present invention, and may be combined with other known techniques. The configurations may be partially omitted or changed within the range not departing from the gist of the invention.

DESCRIPTION OF REFERENCE CHARACTERS

1, 1A: driving assistance device, 2, 80: travel track creation device, 21: position detector, 22, 82: storage, 23, 81: controller, 24: display, 25: actuator, 26, 71: communicator, 27: recording medium reader, 41: map data reader, 42: travel track creator, 42a: arc creator, 42b: clothoid creator, 43: travel track displayer, 44: actuator controller, 48: current location transmitter, 49: travel track receiver, 50: vehicle, 60, 61: driving assistance system, 72: recording medium writer, 83: current location receiver, 84: travel track transmitter, and 90: recording medium.

The invention claimed is:

1. A driving assistance system performing steering operation on a vehicle that is traveling on a road which includes an inlet straight portion, an arc portion continuous to the inlet straight portion, and an outlet straight portion continuous to the arc portion, the driving assistance system comprising:
   a travel track creation device and a controller, the travel track creation device including:
   a travel track creator that creates the travel track including an inlet straight track separated from an outer edge of the inlet straight portion by a predetermined distance toward a center side of the arc portion, an inlet clothoid track continuous to the inlet straight track and formed by connecting a first group of clothoid curves, an arc track continuous to the inlet clothoid track, an outlet clothoid track continuous to the arc track and formed by connecting a second group of clothoid curves, and an outlet straight track continuous to the outlet clothoid track and separated from an outer edge of the outlet straight portion by a predetermined distance toward the center side of the arc portion, wherein
   the travel track creator includes
      an arc creator that creates the arc track which is located further on a side opposite to the center side of the arc portion than a passing target point and a radius of which is as large as possible, the passing target point being separated from an inner edge of the arc portion by a predetermined distance toward the side opposite to the center side of the arc portion; and
      a clothoid creator that creates the inlet clothoid track in which a radius of a last tangential arc corresponds to a radius of the arc track and a start point of which is in contact with the inlet straight track and in which a direction angle of the start point corresponds to a direction angle of the inlet straight track, and the outlet clothoid track in which a radius of a last tangential arc corresponds to a radius of the arc track and which is in contact with the outlet straight track and in which a direction angle of a start point corresponds to a direction angle of the outlet straight track; and, the controller generates a control signal to steer the vehicle according to the travel track.

2. The driving assistance system of claim 1, wherein
the clothoid creator creates the inlet clothoid track in which the radius of the last tangential arc corresponds to a given radius and the start point of which is in contact with the inlet straight track and in which the direction angle of the start point corresponds to the direction angle of the inlet straight track, and the outlet clothoid track in which the radius of the last tangential arc corresponds to the given radius and which is in contact with the outlet straight track and in which the direction angle of the start point corresponds to the direction angle of the outlet straight track, and the arc creator creates an arc by gradually increasing a radius from an initial radius, the arc being located further on the side opposite to the center side of the arc portion than the passing target point and being in contact with the inlet straight track and the outlet straight track, gives a radius of the arc to the clothoid creator, every time a new arc is created, to cause the clothoid creator to create the inlet clothoid track and the outlet clothoid track, determines a location of the arc to be connected to the inlet clothoid track and the outlet clothoid track, and, when the location of the arc enters further on the center side of the arc portion beyond the passing target point, sets the arc before entering further on the center side of the arc portion beyond the passing target point as the arc track by using a binary search.

3. The driving assistance system of claim 2, wherein
the clothoid creator calculates curvatures at a start point and an end point of each of the first group of the clothoid curves and the second group of the clothoid curves by a hyperbolic tangent function or a sigmoid function, calculates clothoid parameters of the first group of the clothoid curves and the second group of the clothoid curves by using the curvatures at the start point and the end point of each of the first group of the clothoid curves and the second group of the clothoid curves, creates the inlet clothoid track by using the clothoid parameter of each of clothoid curves of the first group of the clothoid curves in a manner that a start point of a first clothoid curve of the first group of the clothoid curves is set to an end point of the inlet straight track, a direction angle of the start point of the first clothoid curve is set to the direction angle of the inlet straight track, a start point of a second and subsequent clothoid curves is set to an end point of an immediately preceding clothoid curve, and a direction angle of the start point of the second and subsequent clothoid curves is set to a direction angle of the end point of the immediately preceding clothoid curve, and creates the outlet clothoid track by using the clothoid parameter of each of clothoid curves of the second group of the clothoid curves in a manner that a start point of a first clothoid curve of the second group of the clothoid curves is set to a start point of the outlet straight track, a direction angle of the start point of the first clothoid curve is set to the direction angle of the outlet straight track, a start point of a second and subsequent clothoid curves is set to an end point of an immediately preceding clothoid curve, and a direction angle of the start point of the second and subsequent clothoid curves is set to a direction angle of the end point of the immediately preceding clothoid curve.

4. The driving assistance system of claim 1, wherein
the clothoid creator calculates curvatures at a start point and an end point of each of the first group of the clothoid curves and the second group of the clothoid curves by a hyperbolic tangent function or a sigmoid function, calculates clothoid parameters of the first group of the clothoid curves and the second group of the clothoid curves by using the curvatures at the start point and the end point of each of the first group of the clothoid curves and the second group of the clothoid curves, creates the inlet clothoid track by using the clothoid parameter of each of clothoid curves of the first group of the clothoid curves in a manner that a start point of a first clothoid curve of the first group of the clothoid curves is set to an end point of the inlet straight track, a direction angle of the start point of the first clothoid curve is set to the direction angle of the inlet straight track, a start point of a second and subsequent clothoid curves is set to an end point of an immediately preceding clothoid curve, and a direction angle of the start point of the second and subsequent clothoid curves is set to a direction angle of the end point of the immediately preceding clothoid curve, and creates the outlet clothoid track by using the clothoid parameter of each of clothoid curves of the second group of the clothoid curves in a manner that a start point of a first clothoid curve of the second group of the clothoid curves is set to a start point of the outlet straight track, a direction angle of the start point of the first clothoid curve is set to the direction angle of the outlet straight track, a start point of a second and subsequent clothoid curves is set to an end point of an immediately preceding clothoid curve, and a direction angle of the start point of the second and subsequent clothoid curves is set to a direction angle of the end point of the immediately preceding clothoid curve.

5. The driving assistance system of claim 1, further comprising:
a driving assistance device mounted on the vehicle, wherein
the driving assistance device includes
a display that displays an image; and
a travel track displayer that causes the display to display the travel track.

6. The driving assistance system of claim 1, further comprising:
a driving assistance device mounted on the vehicle, wherein
the driving assistance device includes an actuator that causes a steering column of the vehicle to rotate; and,
the controller operates the actuator by the control signal to thereby cause the steering column to rotate so that the vehicle travels on the travel track.

7. The driving assistance system of claim 1, wherein the travel track creation device further includes a recording medium writer that writes the travel track on a recording medium.

8. The driving assistance system of claim 7, further comprising: a driving assistance device mounted on the vehicle, wherein
the driving assistance device includes
a recording medium reader that reads the travel track recorded on the recording medium by the travel track creation device;
a display that displays an image; and
a travel track displayer that causes the display to display the travel track.

9. The driving assistance system of claim 7, further comprising:
a driving assistance device mounted on the vehicle, wherein
the driving assistance device includes
a recording medium reader that reads the travel track recorded on the recording medium by the travel track creation device;
an actuator that causes a steering column of the vehicle to rotate; and,
the controller operates the actuator by the control signal to thereby cause the steering column to rotate so that the vehicle travels on the travel track.

10. The driving assistance system of claim 1, further comprising a driving assistance device mounted on the vehicle, wherein
the travel track creation device further includes
a current location receiver that receives a current location of the vehicle from the driving assistance device; and
a travel track transmitter that transmits the travel track to the driving assistance device, and
the driving assistance device includes
a display that displays an image;
a travel track receiver that receives the travel track from the travel track creation device; and
a travel track displayer that causes the display to display the travel track.

11. The driving assistance system of claim 1, further comprising a driving assistance device mounted on the vehicle, wherein
the travel track creation device further includes
a current location receiver that receives a current location of the vehicle from the driving assistance device; and
a travel track transmitter that transmits the travel track to the driving assistance device, and
the driving assistance device includes
an actuator that causes a steering column of the vehicle to rotate; and,
the controller operates the actuator by the control signal to thereby cause the steering column to rotate so that the vehicle travels on the travel track.

12. A driving assistance method for creating a travel track and automatically steering a vehicle that is traveling on a road which includes an inlet straight portion, an arc portion continuous to the inlet straight portion, and an outlet straight portion continuous to the arc portion, the method comprising:
a first step of creating the travel track including an inlet straight track separated from an outer edge of the inlet straight portion by a predetermined distance toward a center side of the arc portion, an inlet clothoid track continuous to the inlet straight track and formed by connecting a first group of clothoid curves, an arc track continuous to the inlet clothoid track, an outlet clothoid track continuous to the arc track and formed by connecting a second group of clothoid curves, and an outlet straight track continuous to the outlet clothoid track and separated from an outer edge of the outlet straight portion by a predetermined distance toward the center side of the arc portion, wherein
the first step includes
a second step of creating the arc track which is located further on a side opposite to the center side of the arc portion than a passing target point and a radius of which is as large as possible, the passing target point being separated from an inner edge of the arc portion by a predetermined distance toward the side opposite to the center side of the arc portion; and
a third step of creating the inlet clothoid track in which a radius of a last tangential arc corresponds to a radius of the arc track and a start point of which is in contact with the inlet straight track and in which a direction angle of the start point corresponds to a direction angle of the inlet straight track, and the outlet clothoid track in which a radius of a last tangential arc corresponds to a radius of the arc track and which is in contact with the outlet straight track and in which a direction angle of a start point corresponds to a direction angle of the outlet straight track; and,
the method further comprising:
a fourth step of generating a control signal to steer the vehicle according to the travel track; and
a fifth step of applying the control signal to a steering actuator.

13. A non-transitory computer-readable medium with instructions stored therein, the instructions, when executed by a data processing system, cause the data processing system to perform a travel track creation method for creating a travel track and automatically steering a vehicle that is traveling on a road which includes an inlet straight portion, an arc portion continuous to the inlet straight portion, and an outlet straight portion continuous to the arc portion, the method comprising:
a first step of creating the travel track including an inlet straight track separated from an outer edge of the inlet straight portion by a predetermined distance toward a center side of the arc portion, an inlet clothoid track continuous to the inlet straight track and formed by connecting a first group of clothoid curves, an arc track continuous to the inlet clothoid track, an outlet clothoid track continuous to the arc track and formed by connecting a second group of clothoid curves, and an outlet straight track continuous to the outlet clothoid track and separated from an outer edge of the outlet straight portion by a predetermined distance toward the center side of the arc portion, wherein
the first step includes
a second step of creating the arc track which is located further on a side opposite to the center side of the arc portion than a passing target point and a radius of which is as large as possible, the passing target point being separated from an inner edge of the arc portion by a predetermined distance toward the side opposite to the center side of the arc portion; and
a third step of creating the inlet clothoid track in which a radius of a last tangential arc corresponds to a radius of the arc track and a start point of which is in contact with the inlet straight track and in which a direction angle of the start point corresponds to a direction angle of the inlet straight track, and the outlet clothoid track in which a radius of a last tangential arc corresponds to a radius of the arc track and which is in contact with the outlet straight track and in which a direction angle of a start point corresponds to a direction angle of the outlet straight track; and, the method further comprising:
- a fourth step of generating a control signal to steer the vehicle according to the travel track; and
- a fifth step of applying the control signal to a steering actuator.

* * * * *